United States Patent
Moroga et al.

(10) Patent No.: US 10,880,912 B2
(45) Date of Patent: Dec. 29, 2020

(54) USER TERMINAL AND RADIO COMMUNICATION METHOD

(71) Applicant: NTT DOCOMO, INC., Tokyo (JP)

(72) Inventors: Hideyuki Moroga, Tokyo (JP); Keisuke Saito, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/093,298

(22) PCT Filed: Apr. 13, 2017

(86) PCT No.: PCT/JP2017/015147
§ 371 (c)(1),
(2) Date: Oct. 12, 2018

(87) PCT Pub. No.: WO2017/179658
PCT Pub. Date: Oct. 19, 2017

(65) Prior Publication Data
US 2019/0182856 A1 Jun. 13, 2019

(30) Foreign Application Priority Data
Apr. 15, 2016 (JP) .................................. 2016-082531

(51) Int. Cl.
*H04W 72/12* (2009.01)
*H04L 27/26* (2006.01)
(Continued)

(52) U.S. Cl.
CPC ......... *H04W 72/1268* (2013.01); *H04L 5/005* (2013.01); *H04L 5/0094* (2013.01);
(Continued)

(58) Field of Classification Search
CPC . H04W 72/1268; H04W 72/04; H04W 72/12; H04W 80/08; H04W 72/0453;
(Continued)

(56) References Cited

U.S. PATENT DOCUMENTS 10,004,067 B2 * 6/2018 Sandberg .......... H04W 72/0446
2013/0114756 A1 5/2013 Jia et al.
(Continued)

FOREIGN PATENT DOCUMENTS

WO 2014126519 A1 8/2014
WO WO-2014126519 A1 * 8/2014 .......... H04L 5/0048

OTHER PUBLICATIONS

International Search Report issued in PCT/JP2017/015147 dated Jun. 27, 2017 (1 page).
(Continued)

*Primary Examiner* — Jay P Patel
(74) *Attorney, Agent, or Firm* — Osha Bergman Watanabe & Burton LLP

(57) ABSTRACT

The present invention is designed to implement a format for UL reference signals and/or the like that is suitable for future radio communication systems. The user terminal of the present application includes a transmission section that transmits an uplink (UL) reference signal, and a control section that controls transmission of the UL reference signal, and the control section maps the UL reference signal to at least one resource element based on a first grid, which defines each resource element composed of a subcarrier and a symbol, and a second grid, which defines the arrangement interval of the UL reference signal in the frequency direction and the arrangement interval of the UL reference signal in the time direction.

11 Claims, 24 Drawing Sheets

(51) Int. Cl.
*H04W 72/04* (2009.01)
*H04L 5/00* (2006.01)
*H04W 80/08* (2009.01)

(52) U.S. Cl.
CPC .......... *H04L 27/26* (2013.01); *H04L 27/2607* (2013.01); *H04W 72/04* (2013.01); *H04W 72/0453* (2013.01); *H04W 72/12* (2013.01); *H04W 80/08* (2013.01)

(58) Field of Classification Search
CPC ... H04L 27/26; H04L 27/2607; H04L 5/0094; H04L 5/005; H04L 5/0007; H04L 5/0051; H04L 5/0091
See application file for complete search history.

(56) References Cited

U.S. PATENT DOCUMENTS

| | | | | |
|---|---|---|---|---|
| 2013/0114759 A1* | 5/2013 | Buckley | ............ | H03M 13/2957 375/295 |
| 2015/0071103 A1* | 3/2015 | Xu | ........................ | H04L 43/028 370/252 |
| 2015/0318968 A1* | 11/2015 | Kim | .................... | H04L 65/4076 370/329 |
| 2016/0020891 A1* | 1/2016 | Jung | ..................... | H04L 5/0064 370/280 |
| 2017/0111930 A1* | 4/2017 | Rajagopal | ........... | H04W 74/006 |
| 2017/0171842 A1* | 6/2017 | You | ....................... | H04L 5/0048 |
| 2017/0223626 A1* | 8/2017 | Zhuang | ............... | H04W 52/242 |
| 2018/0007673 A1* | 1/2018 | Fwu | ........................ | H04W 4/70 |
| 2018/0110057 A1* | 4/2018 | Park | ...................... | H04B 7/0404 |
| 2018/0212732 A1* | 7/2018 | You | ....................... | H04L 5/0053 |
| 2018/0220405 A1* | 8/2018 | Feng | ...................... | H04W 4/50 |
| 2018/0262882 A1* | 9/2018 | You | ..................... | H04W 72/005 |
| 2018/0359068 A1* | 12/2018 | Kim | ...................... | H04W 72/14 |
| 2019/0036746 A1* | 1/2019 | Hwang | ................. | H04L 1/0061 |
| 2019/0045487 A1* | 2/2019 | You | ................... | H04W 72/0446 |
| 2019/0165906 A1* | 5/2019 | Bala | ...................... | H04L 5/0048 |
| 2020/0274668 A1* | 8/2020 | Yamada | .............. | H04L 41/0806 |

OTHER PUBLICATIONS

Written Opinion of the International Searching Authority issued in PCT/JP2017/015147 dated Jun. 27, 2017 (4 pages).

Samsung; "Numerology and frame structure for 5G new radio interface: sub-6GHz"; 3GPP TSG RAN WG1 #84bis, R1-162179; Busan, Korea; Apr. 11-15, 2016 (5 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in European Application No. 17782471.1, dated Nov. 4, 2019 (8 pages).

Office Action in counterpart European Patent Application No. 17782471.1 dated Jun. 24, 2020 (4 pages).

* cited by examiner $\Delta f_{RS}$=FUNCTION OF MAXIMUM DELAY SPREAD $\Delta t_{RS}$=FUNCTION OF MAXIMUM DOPPLER FREQUENCY

⊘ UL REFERENCE SIGNAL

NUMEROLOGY GRID

RS GRID

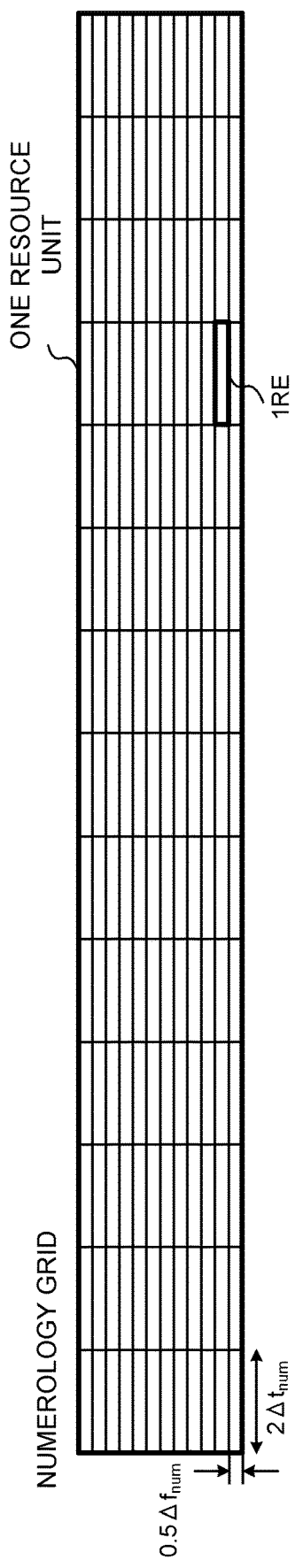
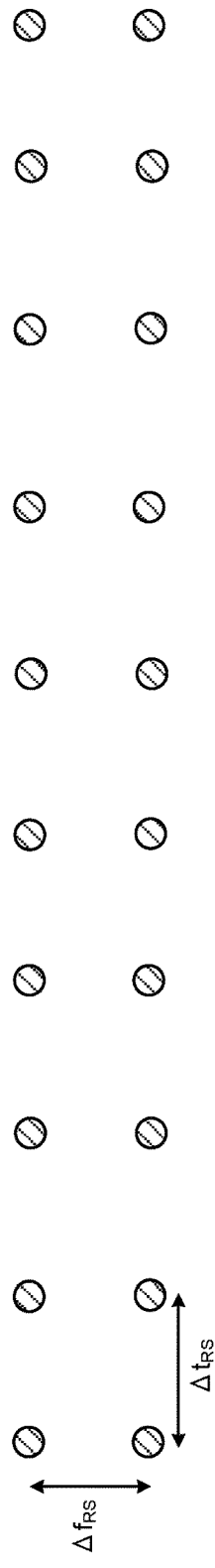
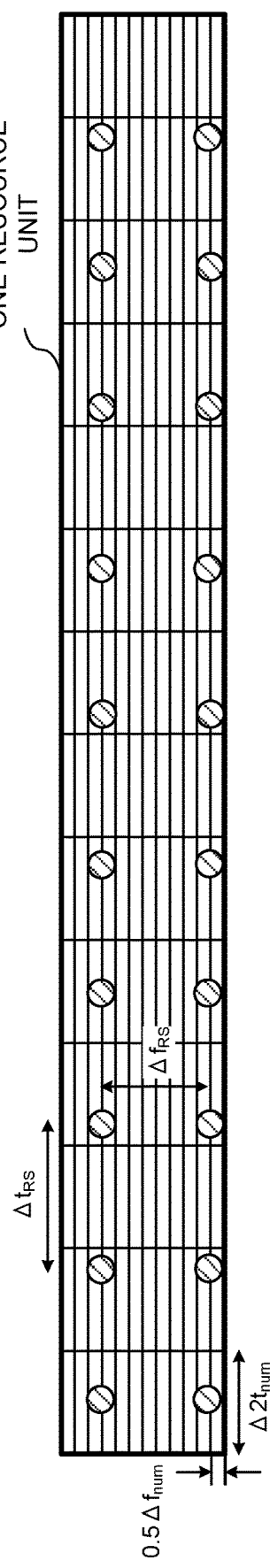

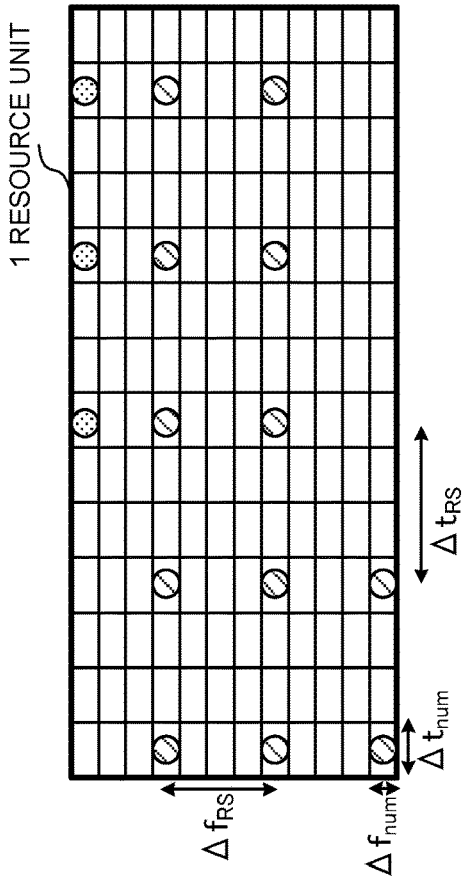
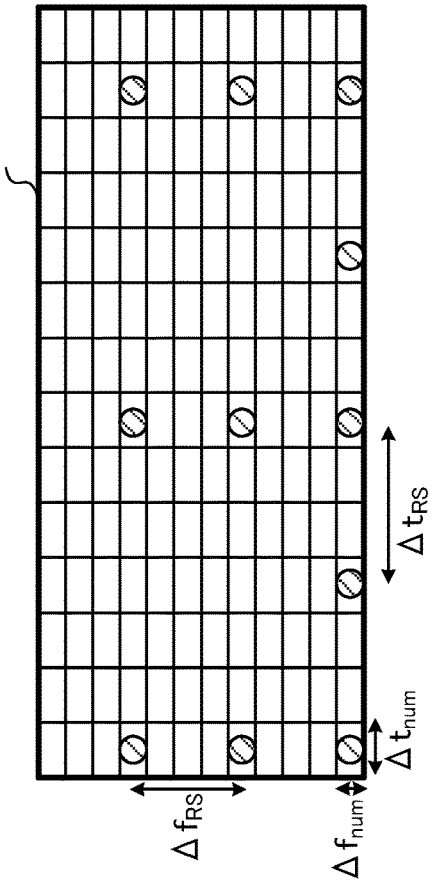
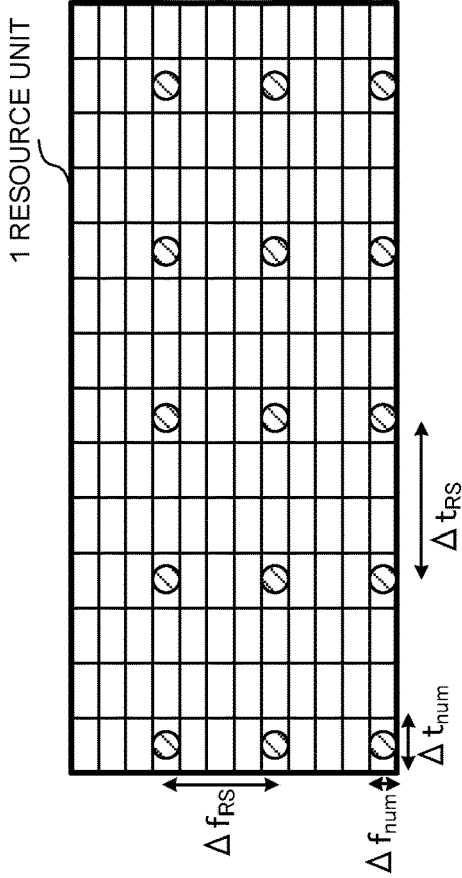
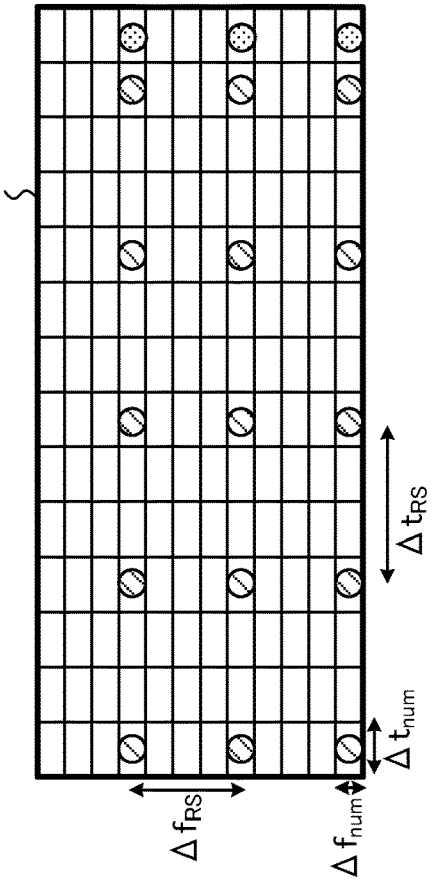

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, successor systems of LTE (referred to as, for example, "LTE-A" (LTE-Advanced), "FRA (Future Radio Access)," "5G (5th generation mobile communication system)," 5G+ (5G plus)," "New-RAT (Radio Access Technology)," and so on) are also under study for the purpose of achieving further broadbandization and increased speed beyond LTE.

In existing LTE systems (for example, LTE Rel. 8 to 13), the transmission time intervals (TTIs) that are applied to the downlink (DL) transmission and uplink (UL) transmission between radio base stations and user terminals are configured to one ms and controlled. A TTI refers to a time unit in which channel-coded data packet (transport block) is transmitted, and serves as the processing unit in scheduling, link adaptation, etc. A TTI in existing LTE systems is also referred to as a "subframe," "subframe duration" and so on.

Also, in existing LTE systems, when the normal cyclic prefix (CP) is used, one TTI is configured to include fourteen symbols. In the event the normal CP is used, the time duration (symbol duration) of each symbol is 66.7 μs, and the subcarrier spacing is 15 kHz. Also, in the event an enhanced CP, which is longer than the normal CP, is used, one TTI is configured to include twelve symbols.

CITATION LIST

Non-Patent Literature

Non-Patent Literature 1: 3 GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G) are under study to use wide-band frequency spectra in order to meet the demands for ultra-high speed, large capacity, ultra-low delay and so on. Consequently, for future radio communication systems, a study is in progress to reserve wide-band frequency spectra by using frequency bands (hereinafter referred to as "high frequency bands") that are higher (for example, 30 to 70 GHz band) than the relatively low frequency bands (hereinafter referred to as "low frequency bands") used in existing LTE systems.

Also, in future radio communication systems, wide coverage may be reserved by using low frequency bands used in existing LTE systems. In such future radio communication systems, study is in progress to design a new radio access scheme (RAT (Radio Access Technology) (hereinafter referred to as "5G RAT") to support wide frequency bands from low frequency bands to high frequency bands.

Because the difficulty to implement radio circuits, the channel environment and so on vary significantly per frequency band such as a low frequency band, a high frequency band and so on, a plurality of different numerologies may be introduced in 5G RAT. Numerology refers to communication parameters in the frequency direction and/or the time direction (for example, at least one of the interval between subcarriers (subcarrier spacing), the symbol duration, the time duration of CPs (CP duration), the time duration of TTIs (TTI duration), the number of symbols per TTI, the radio frame format, etc.).

Thus, in future radio communication systems in which one or more numerologies are likely to be introduced, if UL reference signals (RSs) and/or the like of existing formats are used, there is a possibility that the UL reference signals and/or the like cannot be arranged (mapped) adequately, or that the target performance cannot be achieved with the reference signals and/or the like of existing formats. Therefore, formats for UL reference signals and so on that are suitable for future radio communication systems are in demand.

The present invention has been made in view of the above, and it is therefore an object of the present invention to provide a user terminal and a radio communication method that make it possible to implement a format for UL reference signals and/or the like that is suitable for future radio communication systems.

Solution to Problem

According to one aspect of the present invention, a user terminal has a transmission section that transmits an uplink (UL) reference signal, and a control section that controls transmission of the UL reference signal, and, in this user terminal, the control section maps the UL reference signal to at least one resource element based on a first grid, which defines each resource element composed of a subcarrier and a symbol, and a second grid, which defines the arrangement interval of the UL reference signal in the frequency direction and the arrangement interval of the UL reference signal in the time direction.

Advantageous Effects of Invention

According to the present invention, it is possible to implement a format for UL reference signals and/or the like that is suitable for future radio communication systems.

BRIEF DESCRIPTION OF DRAWINGS

FIG. 8A to FIG. 8C provide diagrams to show other examples of arrangements of UL reference signals in a second example of format according to the first aspect;

FIG. 14A to FIG. 14D provide diagrams to show a fifth example of correction of arranged RE according to the first aspect;

DESCRIPTION OF EMBODIMENTS

Radio access schemes (5G RAT) for future radio communication systems are expected to introduce one or more numerologies in order to support wide frequency bands and various services with different requirements. Here, a numerology refers to a set of communication parameters (radio parameters) in the frequency and/or time direction. This set of communication parameters may include at least one of, for example, the subcarrier spacing, the symbol duration, the CP duration, the TTI duration, the number of symbols per TTI and the radio frame format.

When "numerologies are different," this means that, for example, at least one of the subcarrier spacing, the symbol duration, the CP duration, the TTI duration, the number of symbols per TTI and the radio frame format is different between numerologies, but this is by means limiting.

Figure 1:
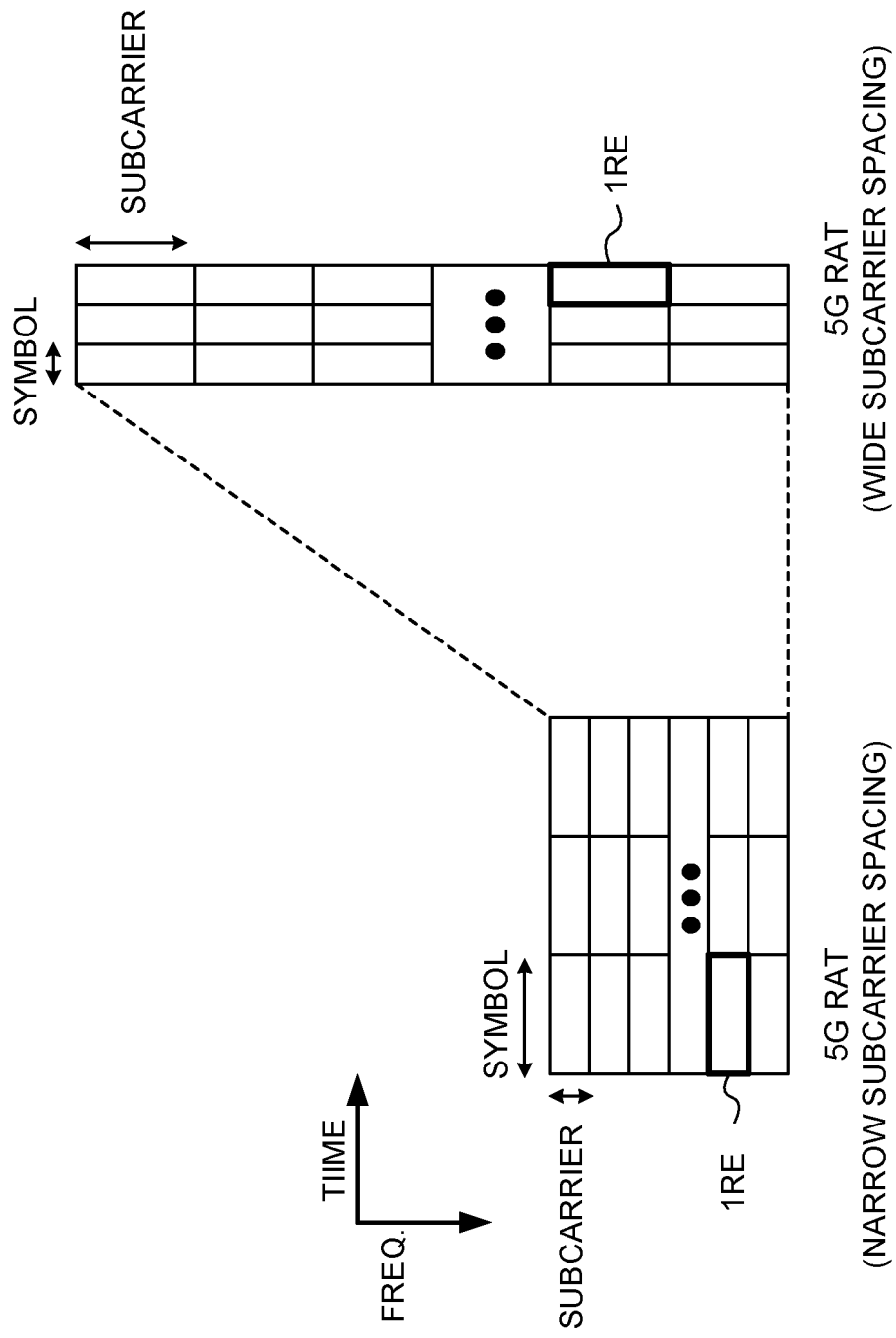
FIG. 1 is a diagram to show examples of numerologies.

FIG. 1 is a diagram to show examples of numerologies for use in 5G RAT. As shown in FIG. 1, in 5G RAT, a plurality of different numerologies with different symbol durations and subcarrier spacings may be introduced. In FIG. 1, symbol duration and subcarrier spacing are shown as examples of numerologies, but numerologies are by no means limited to these.

For example, FIG. 1 shows a first numerology adopting relatively narrow subcarrier spacing (for example, 15 kHz) and a second numerology adopting relatively wide subcarrier spacing (for example, 30 to 60 kHz). The subcarrier spacing of the first numerology may be the same as the subcarrier spacing in existing LTE systems—that is, 15 kHz. The subcarrier spacing of the second numerology may be N (N>1) times the subcarrier spacing of the first numerology.

Furthermore, subcarrier spacing and symbol duration are mutually reciprocal. Therefore, if the subcarrier spacing of the second numerology is made N times the subcarrier spacing of the first numerology, the symbol duration in the second numerology becomes 1/N of the symbol duration of the first numerology. Also, as shown in FIG. 1, the first numerology and the second numerology also have different structure of resource elements (REs), which are formed with subcarriers and symbols.

When the subcarrier spacing becomes wider, the deterioration of communication quality due to phase noise produced by radio base stations and the transmitters/receivers of user terminals can effectively be prevented. In particular, in high frequency bands such as several tens of GHz, the deterioration of communication quality can be effectively prevented by expanding the subcarrier spacing. Therefore, the second numerology, in which the subcarrier spacing is wider than in the first numerology, is suitable for communication in high frequency bands.

Also, as the symbol duration becomes shorter, the TTI duration formed with a predetermined number (for example, fourteen or twelve) of symbols also becomes shorter, this is effective for reducing the deterioration of communication quality caused by channel fluctuation by Doppler shift when the user terminal moves and reducing latency (latency reduction). In IoT (Internet of Things), MTC (Machine Type Communication), M2M (Machine To Machine), URLLC (Ultra-reliable and low latency communication) etc., although the amount of data is small, reduced latency is required. For such services that impose strict requirements on latency, a second numerology with a shorter symbol duration than the first numerology is suitable. Note that a TTI that is shorter than in existing LTE systems (for example, a TTI less than one ms) may be referred to as a "shortened TTI," a "short TTI," and so on.

Although not shown, the number of symbols to constitute the TTI of each numerology may be the same as in existing LTE systems (for example, fourteen when the normal CP is used, twelve when an enhanced CP is used, and so on), or may be different. Furthermore, the unit of resource allocation (resource unit) in each numerology may be the same as or different from the resource block pair in existing LTE systems (which is, for example, twelve subcarriers×fourteen symbols, and also referred to as a "PRB (Physical Resource Block) pair"). A resource unit that is different from existing LTE systems may be referred to as an "enhanced RB (ERB)" and so on.

Furthermore, the symbols for use in each numerology may be OFDM (Orthogonal Frequency Division Multiplexing) symbols, or may be other symbols such as SC-FDMA (Single Carrier Frequency Division Multiple Access) symbols.

Also, although not shown, a format which makes the subcarrier spacing 1/N of existing LTE systems and makes the symbol duration N times as large may be another possible example of numerology. According to this configuration, the overall symbol duration increases, so that, even when the ratio of CP duration to overall symbol duration is constant, the CP duration can be lengthened. This enables more robust radio communication against fading in communication paths.

Furthermore, the numerologies for use by user terminals may be configured semi-statically via higher layer signaling, such as RRC (Radio Resource Control) signaling or broadcast information, or may be changed dynamically via L1/L2 control channels, for example.

Thus, in future radio communication systems in which one or more numerologies are expected to be introduced, when existing formats for UL reference signals and/or the like are used, there is a fear that it is not possible to arrange (mapping) UL reference signals and/or the like adequately.

To be more specific, in existing LTE systems, resource elements (REs) for arranging UL reference signals (for example, demodulation reference signals (DM-RSs), sounding reference signals (SRSs), etc.) are determined based on one PRB pair (for example, twelve subcarriers×fourteen symbols), which is the unit of resource allocation.

However, in future radio communication systems, as described above, one or more numerologies will be introduced. As mentioned earlier, it is also envisioned that these numerologies will define REs, which are composed of subcarriers and symbols, differently from the REs of LTE systems. It is also assumed that the resource units (its frequency bandwidth and time duration) that serve as units of resource allocation will be defined differently from one PRB pair in existing LTE systems.

Therefore, if a UL reference signal format in existing LTE systems is applied to future radio communication systems, there is a possibility that UL reference signals cannot be arranged properly in REs that constitute resource units. Therefore, the present inventors have studied a format for UL reference signals and/or the like that is suitable for future radio communication systems, and arrived at the present invention.

To be more specific, the present inventors have come up with the idea of allowing UL reference signals to be arranged (mapped) in a flexible manner, when one or more numerologies are introduced, by defining a format for UL reference signals and/or the like based on a second grid (the reference signal (RS) grid, which will be described later), which is independent of the first grid (the numerology grid, which will be described later) that defines each resource element composed of a subcarrier and a symbol.

Now, the present embodiment will be described below detail. In the following description, the format (mapping, arrangement, allocation, generation, etc.) of UL reference signals will be explained. The UL reference signals may include at least one of, for example, DM-RSs, SRSs and so on.

Also, signals that can be applied to the present embodiment are not limited to UL reference signals, and other UL signals and/or UL channels are also applicable. These UL signals may include, for example, random access preambles (PRACH: Physical Random Access Channel) and so on.

Although, in the following description, the format of UL reference signals of one antenna port (layer) will be exemplified, the present embodiment can be applied to UL reference signals of a plurality of antenna ports (layers) as appropriate.

First Aspect

With the first aspect of the present invention, UL reference signals that are defined by the reference signal (RS) grid, which is independent of the numerology grid, will be described. A radio base station maps UL reference signals to at least one resource element (RE) based on the numerology grid and the RS grid.

Here, the numerology grid (first grid) is the grid to define each RE composed of subcarriers and symbols. The numerology grid is based on the above-described numerology (that is, at least one of the subcarrier spacing, the symbol duration, the CP duration, the TTI duration, the number of symbols per TTI and the radio frame format).

In addition, the RS grid (second grid) is the grid to define the arrangement of UL reference signals (for example, the interval at which UL reference signals are arranged in the frequency direction and the interval at which UL reference signals are arranged in the time direction).

Figure 2A:
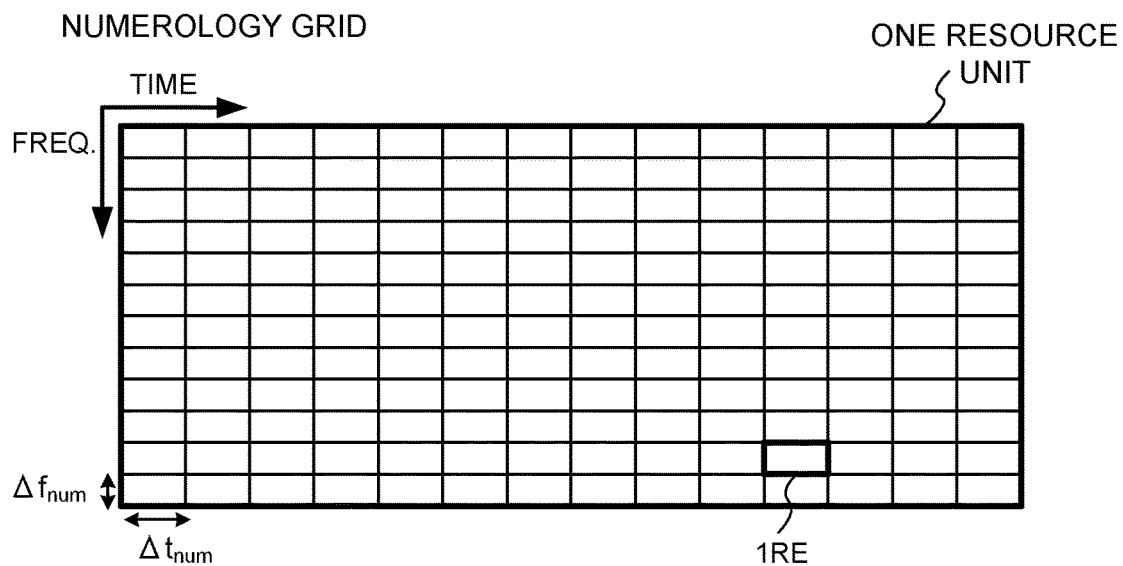
FIG. 2A and FIG. 2B provide diagrams to show examples of numerology grid and RS grid.
Figure 2B:
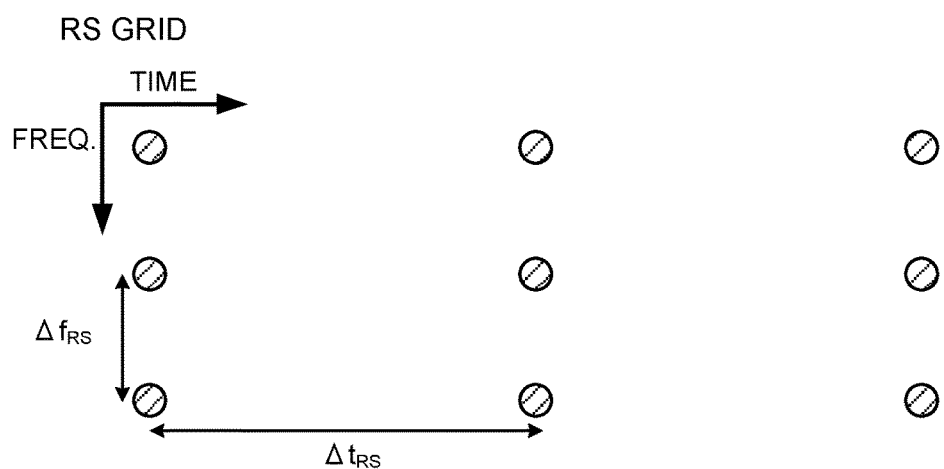

FIG. 2 provide diagrams to show examples of a numerology grid and an RS grid. FIG. 2A shows an example of a numerology grid, and FIG. 2B shows an example of an RS grid.

As shown in FIG. 2A, the numerology grid may be defined by subcarrier spacing $\Delta f_{num}$ and symbol duration $\Delta t_{num}$. In FIG. 2A, the numerology grid constitutes multiple REs, and each RE is composed of one subcarrier of predetermined subcarrier spacing $\Delta f_{num}$ and one symbol of predetermined symbol duration $\Delta t_{num}$.

Also, the numerology grid may show a resource unit, which serves as the unit of resource allocation (also referred to as a "resource block," a "resource block pair," etc.). For example, in FIG. 2A, a resource unit is defined by 168 REs, composed of fourteen symbols and twelve sub carriers. Note that these fourteen symbols may be referred to as "one TTI," and the twelve subcarriers may be referred to as "one PRB."

Also, one or more varying numerology grids may be defined (for example, a plurality of numerology grids in which $\Delta f_{num}$ and $\Delta t_{num}$ vary). These one or more numerology grids may be defined in advance or may be configured through higher layer signaling.

Also, in these one or more numerology grids, the grid interval in the frequency direction (for example, $\Delta f_{num}$) and the grid interval in the time direction (for example, $\Delta t_{num}$) may be each configured by separate higher layer signaling. Also, a plurality of candidate numerology grids may be configured through higher layer signaling, and one numerology grid that is selected from the candidates may be reported to the user terminal via an L1/L2 control channel.

Also, in these one or more numerology grids, the grid interval in the frequency direction (for example, $\Delta f_{num}$) and the grid interval in the time direction (for example, $\Delta t_{num}$) may be reported in separate broadcast information.

Also, in these one or more numerology grids, the grid interval in the frequency direction (for example, $\Delta f_{num}$) and the grid interval in the time direction (for example, $\Delta t_{num}$) may be reported via separate control channels.

Meanwhile, as shown in FIG. 2B, the RS grid may be determined based on at least one of delay spread, Doppler frequency, and system requirements. To be more specific, in the RS grid, interval $\Delta f_{RS}$, at which UL reference signals are arranged along the frequency direction, may be determined based on the maximum delay spread (for example, coherent bandwidth) (or based on its function). On the other hand, interval $\Delta t_{RS}$, at which UL reference signals are arranged along the time direction, may be determined based on the maximum Doppler frequency (for example, coherent time interval) (or by its function). Alternatively, arrangement intervals $\Delta f_{RS}$ and $\Delta t_{RS}$ in the frequency direction and the time direction may be determined based on system requirements (for example, the maximum moving speed of user terminals which the system supports) and so on.

In addition, an RS grid may be fixedly defined for a plurality of different numerology grids (in other words, only one RS grid may be configured). Alternatively, multiple RS grids that correspond to multiple different numerology grids, respectively, may be defined. Alternatively, multiple RS grids may be defined in relationship to a single numerology grid.

Also, a plurality of grids that correspond respectively to a plurality of different UL reference signals (for example, DM-RSs and SRSs) may be defined. Furthermore, RS grids may be defined based on at least one of the number of transmission layers and the number of antenna ports.

$\Delta f_{RS}$ and $\Delta t_{RS}$ may be reported separately, or a combination of sets may be defined in advance and reported.

One or more RS grids such as the above may be defined in advance, may be configured through higher layer signaling, or may be reported through control channels. In an RS grid, the grid interval in the frequency direction (for example, $\Delta f_{RS}$) and the grid interval in the time direction (for example, $\Delta t_{RS}$) may be configured via separate higher layer signaling. Furthermore, multiple candidate RS grids may be configured through higher layer signaling, and one RS grid that is selected from the candidates may be reported to the user terminal via an L1/L2 control channel.

Note that, assuming that numerology grids and/or RS grids are provided, as illustrated in FIG. 2, grids per se may be defined in the specification, or grids may be represented by predetermined equations. For example, an RS grid may be provided in the form of an equation based on above $\Delta t_{RS}$ and $\Delta t_{RS}$. In addition, a numerology grid may be provided in the form of an equation based on above $\Delta t_{num}$ and $\Delta f_{num}$. If an RS grid is represented by a predetermined equation, the RS grid can be changed adaptively depending on the numerology (that is, RS grids can be defined on a per numerology basis), by considering numerology-based parameters in the predetermined equation.

As described above, the numerology grid defines substantive resources (a plurality of REs) that are used to transmit UL signals, whereas the RS grid does not define substantive resources, and determines only the arrangement of UL reference signals (allocation, arrangement interval, arrangement pattern, etc.). By determining the REs to arrange UL reference signals based on both the numerology grid and the RS grid, it is possible to arrange (map) UL reference signals adequately even when one or more numerologies are introduced and the definition of substantive resources (REs, resource units, etc.) is not constant.

Hereinafter, specific formats of UL reference signals and examples of mapping based on numerology grids and RS grids will be described below.

First Example of Format

With the first example of format, a UL reference signal format for use when keeping the numerology grid constant will be shown. With the first example of format, a plurality of RS grids, in which UL reference signals are arranged at different intervals in the frequency direction and/or the time direction, may be applied to a single numerology grid.

Referring to FIG. 3 to FIG. 5, the RS grids to use in the first example of format and examples of arrangements of UL reference signals using these RS grids will be described. Note that, in FIG. 3 to FIG. 5, the values of $\Delta f_{num}$, $\Delta t_{num}$, $\Delta f_{RS}$ and $\Delta t_{RS}$ are all constant. Also, the numerology grids, the RS grids and the arrangements of UL reference signals shown in FIG. 3 to FIG. 5 are simply examples, and these are by no means limiting. Furthermore, the numerology grids and/or the RS grids shown in FIG. 3 to FIG. 5 may be represented by predetermined equations.

Figure 3A:
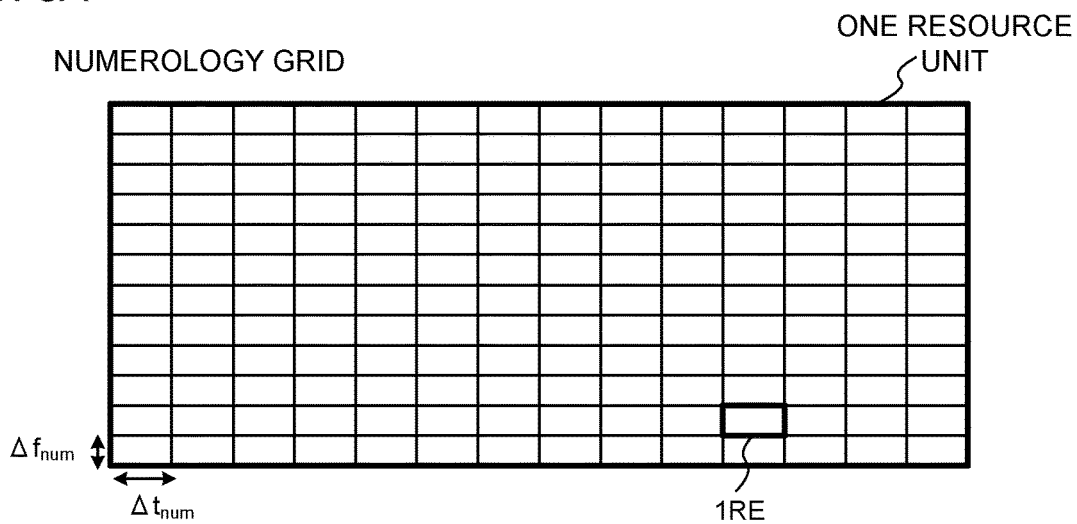
FIG. 3A to FIG. 3C provide diagrams to show examples of arrangements of UL reference signals in a first example of format according to a first aspect of the present invention.
Figure 3B:
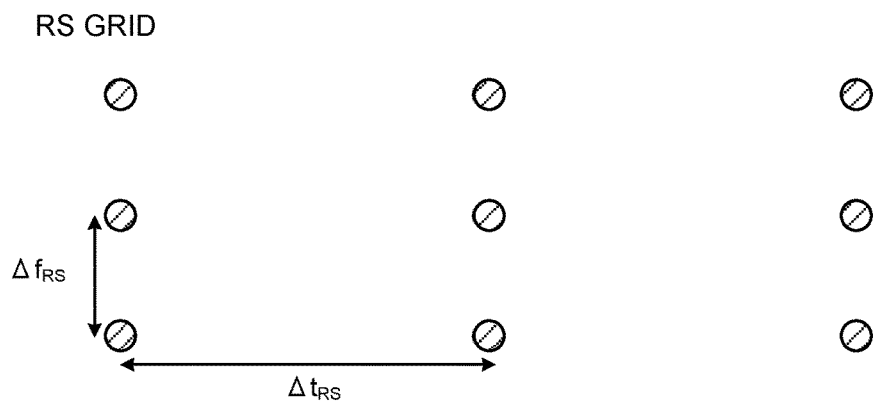
Figure 3C:
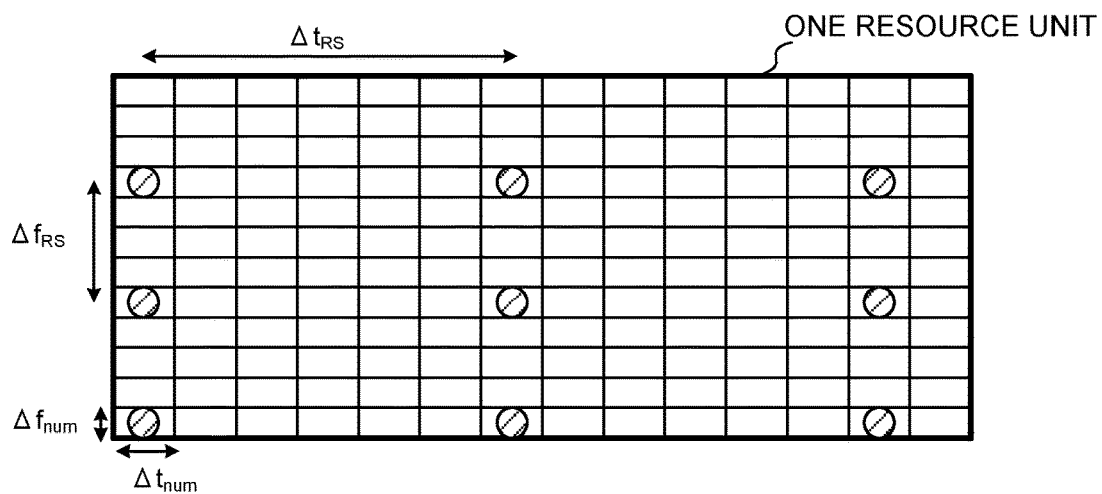

FIG. 3 show an example (initial state) of a UL reference signal format for use when keeping the numerology grid constant. As shown in FIG. 3C, the format of UL reference signals (the REs where the UL reference signals are mapped) may be determined by superimposing the numerology grid shown in FIG. 3A and the RS grid shown in FIG. 3B.

For example, the RS grid may be superimposed on the numerology grid with reference to a predetermined symbol and/or a predetermined subcarrier in the numerology grid (here, the first symbol in the resource unit and the subcarrier of the lowest or highest frequency). When the RS grid is represented by a predetermined equation, this predetermined equation may be based on symbol indices and/or subcarrier indices in the resource unit.

In the RS grid of FIG. 3B, arrangement interval MRS of UL reference signals in the frequency direction matches four subcarriers in the numerology of FIG. 3A, and arrangement interval $\Delta t_{RS}$ in the time direction matches six symbols in the numerology of FIG. 3A. In this case, as shown in FIG. 3C, UL reference signals are allocated to REs every four subcarriers and every six symbols.

Figure 4A:
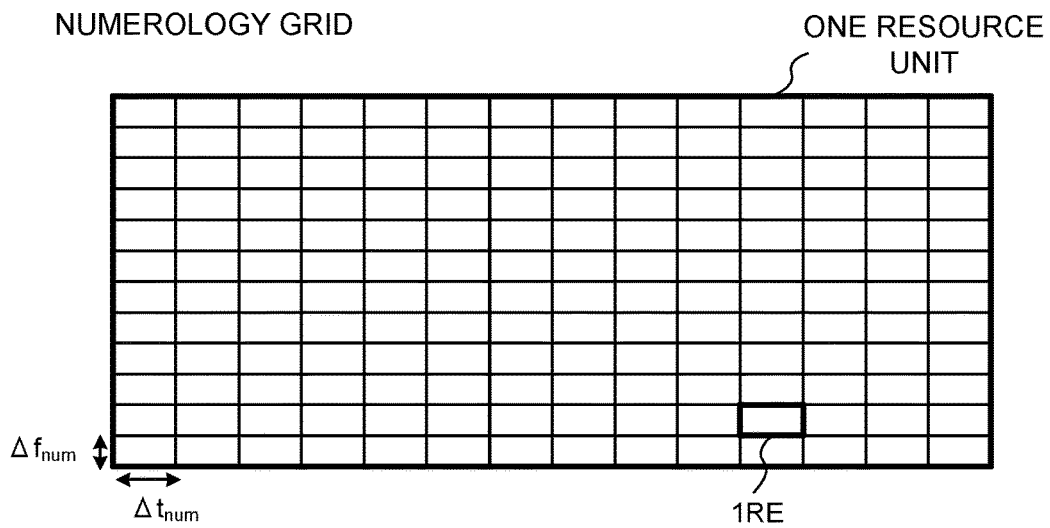
FIG. 4A to FIG. 4C provide diagrams to show other examples of arrangements of UL reference signals in the first example of format according to the first aspect.
Figure 4B:
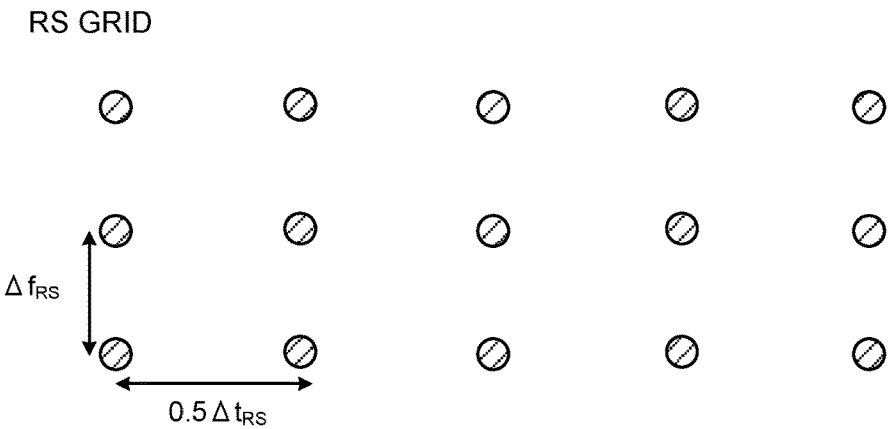

FIG. 4 show an example of a UL reference signal format using an RS grid which shortens (densifies) the arrangement interval in the time direction when the numerology grid is made constant. In this case, $\Delta t_{RS}$ may be multiplied by a predetermined coefficient. For example, in the RS grid shown in FIG. 4B, the arrangement interval of UL reference signals in the time direction is $0.5 \times \Delta t_{RS}$, and this is half of arrangement interval $\Delta t_{RS}$ in the time direction shown in FIG. 3B.

Figure 4C:
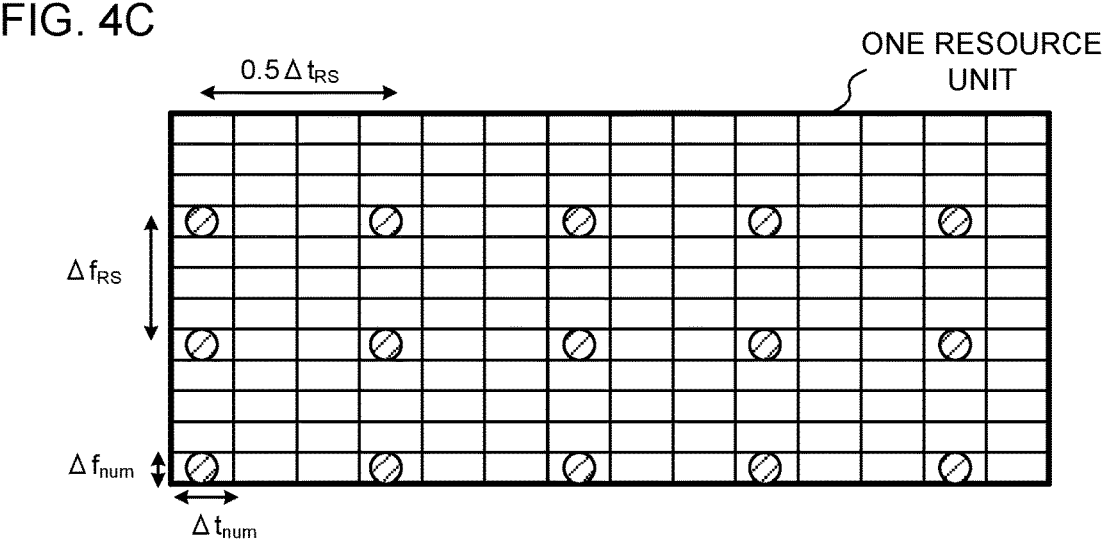

For example, in the RS grid of FIG. 4B, arrangement interval $\Delta f_{RS}$ of UL reference signals in the frequency direction matches four subcarriers in the numerology of FIG. 4A, and the arrangement interval $0.5 \times \Delta t_{RS}$ in the time direction matches three symbols in the numerology of FIG. 4A. In this case, as shown in FIG. 4C, UL reference signals are arranged in REs every four subcarriers and every three symbols.

As shown in FIG. 4, in the event the numerology is made constant, the arrangement interval in the time direction in the RS grid is made dense, so that it is possible to more flexibly cope with changes in frequency due to the Doppler effect.

Figure 5A:
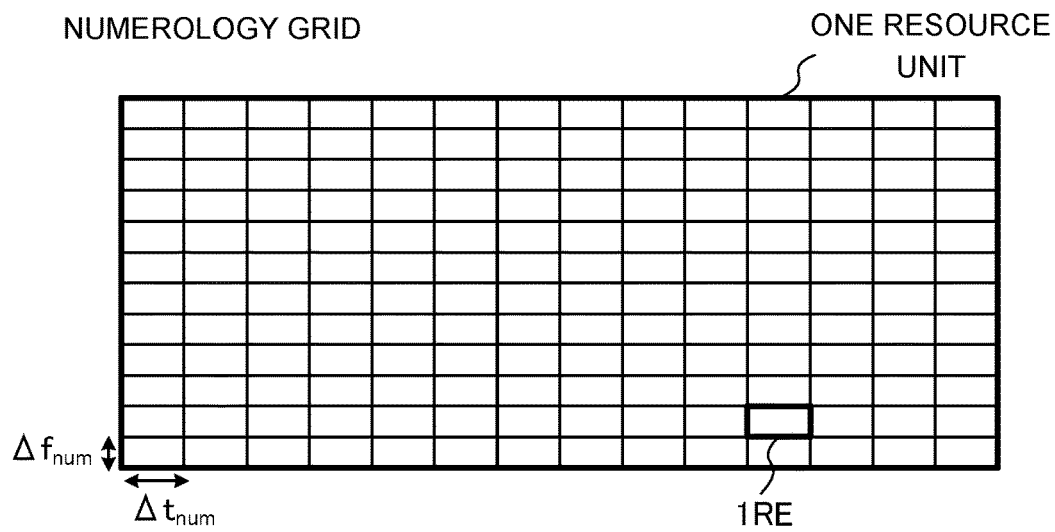
FIG. 5A to FIG. 5C provide diagrams to show other examples of arrangements of UL reference signals in the first example of format according to the first aspect.
Figure 5B:
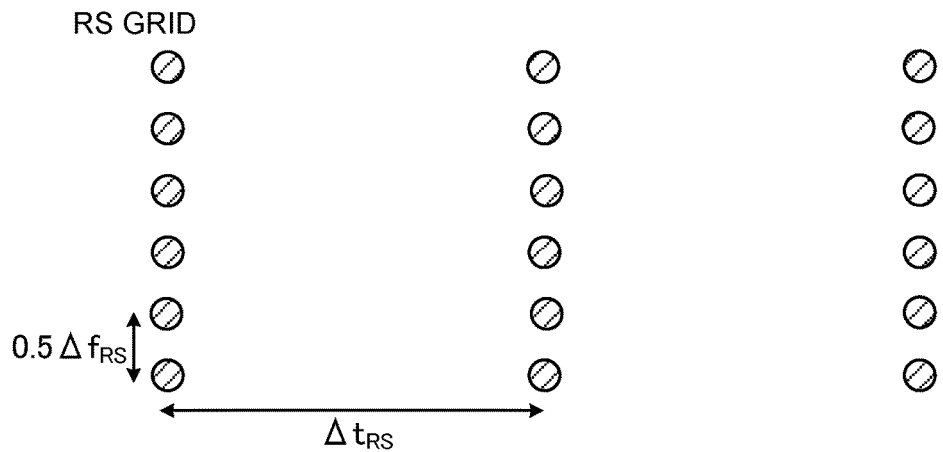

FIG. 5 show an example of a UL reference signal format to use an RS grid that shortens (densifies) the arrangement interval in the frequency direction when the numerology grid is made constant. In this case, $\Delta f_{RS}$ may be multiplied by a predetermined coefficient. For example, in the RS grid shown in FIG. 5B, the arrangement interval of UL reference signals in the frequency direction is $0.5 \times \Delta f_{RS}$, and this is half of arrangement interval $\Delta f_{RS}$ in the frequency direction shown in FIG. 3B.

Figure 5C:
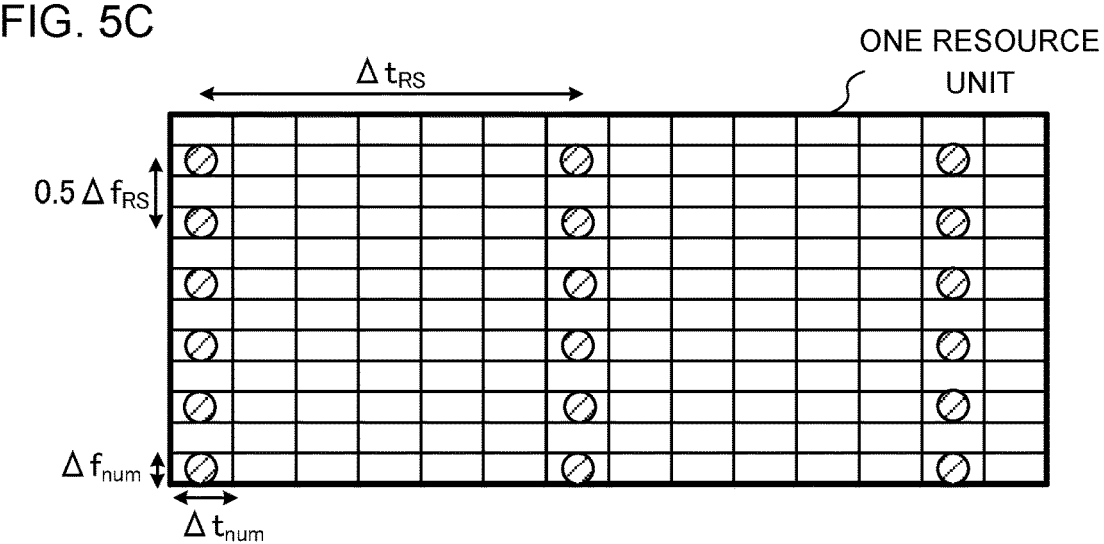

For example, in the RS grid of FIG. 5B, the arrangement interval of UL reference signals in the frequency direction, $0.5 \times \Delta f_{RS}$, matches two subcarriers in the numerology of FIG. 5A, arrangement interval $\Delta t_{RS}$ in the time direction matches six symbols in the numerology of FIG. 5A. In this case, as shown in FIG. 5C, UL reference signals are allocated to REs every two subcarriers and every six symbols.

As shown in FIG. 5, in the event the numerology is made constant, the interval of arrangement in the frequency direction in the RS grid is made dense, so that the user terminal can measure the channel quality in the frequency direction with higher density, and, consequently, cope with higher frequency selectivity.

Although not illustrated, when making the numerology grid constant in the first example of format, an RS grid to shorten (densify) the arrangement interval in both the time direction and the frequency direction may be used. In this case, it is possible to more flexibly cope with channel variations over time and frequency selectivity.

Second Example of Format

With a second example of format, an example of a UL reference signal format for use when keeping the RS grid constant will be shown. With the second example of format, a single RS grid may be applied to multiple numerologies with different subcarrier spacings and/or symbol durations.

Referring to FIG. 6 to FIG. 8, the RS grids used in the second example of format and examples of arrangements of UL reference signals using these RS grids will be described. In FIG. 6 to FIG. 8, the values of $\Delta f_{num}$, $\Delta t_{num}$, $\Delta f_{RS}$ and $\Delta t_{RS}$ are assumed to be constant. Also, the numerology grids, the RS grids and the arrangements of UL reference signals shown in FIG. 6 to FIG. 8 are simply examples, and these are by no means limiting. Differences from the first example of format will be primarily described below.

Figure 6A:
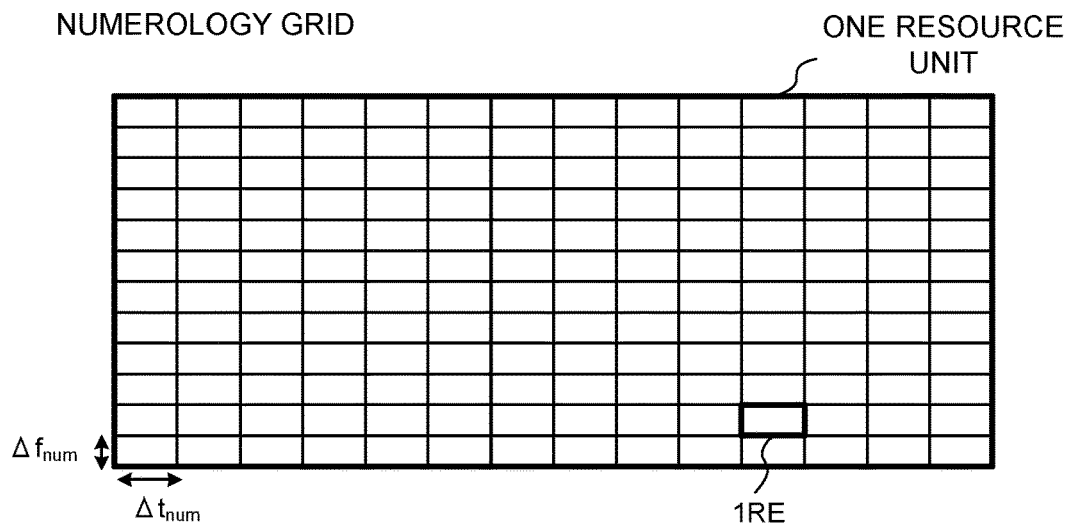
FIG. 6A to FIG. 6C provide diagrams to show examples of arrangements of UL reference signals in a second example of format according to the first aspect.
Figure 6B:
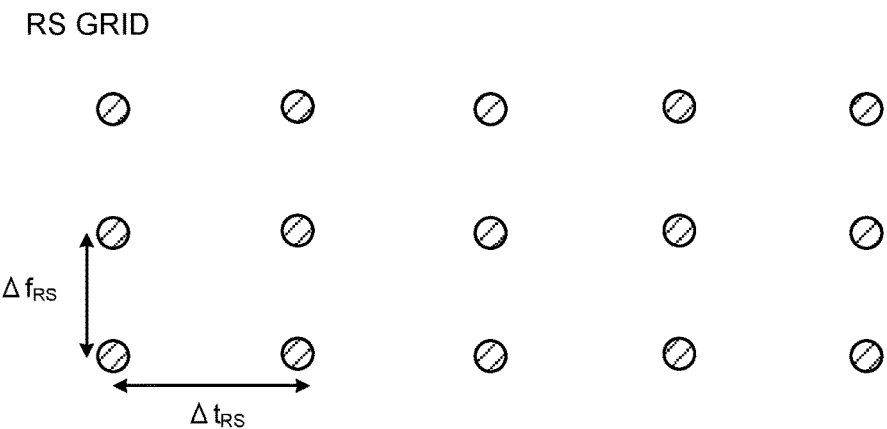
Figure 6C:
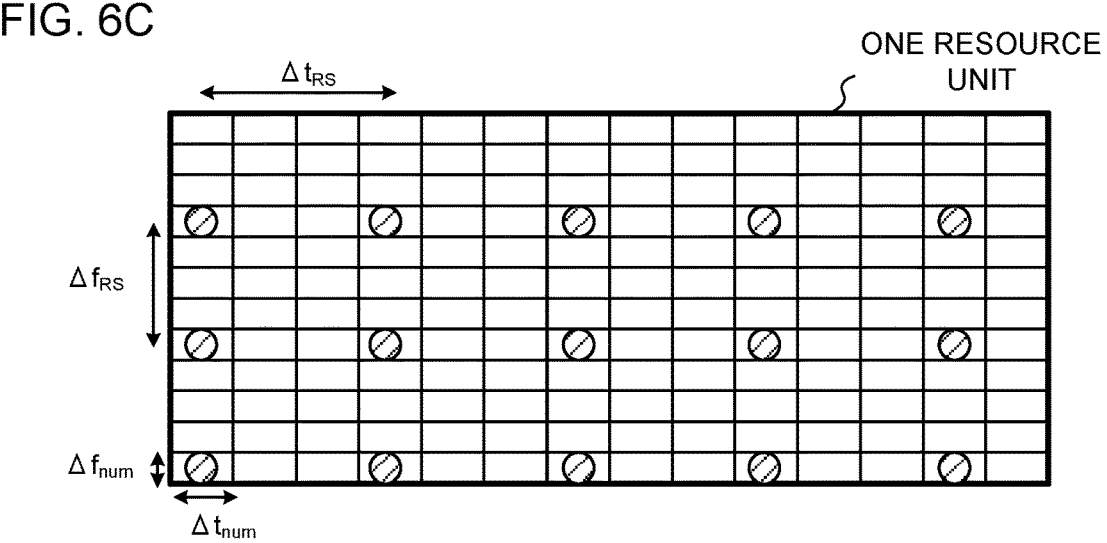

FIG. 6 show an example (initial state) of a UL reference signal format for use when keeping the RS grid constant. As shown in FIG. 6C, the format of UL reference signals (the REs where UL reference signals are mapped) may be determined by superimposing the numerology grid shown in FIG. 6A and the RS grid shown in FIG. 6B.

For example, in the RS grid of FIG. 6B, arrangement interval $\Delta f_{RS}$ of UL reference signals in the frequency direction matches four subcarriers in the numerology of FIG. 6A, and arrangement interval $\Delta t_{RS}$ in the time direction matches three symbols in the numerology of FIG. 6A. In this case, as shown in FIG. 6C, UL reference signals are arranged in REs every four subcarriers and every three symbols.

FIG. 7 show an example of a UL reference signal format that uses a constant RS grid when using a numerology grid that shortens (densifies) the symbol duration (that is, lengthens the subcarrier spacing). In this case, $\Delta f_{num}$ and $\Delta t_{num}$ may be multiplied by predetermined coefficients.

Figures 7A, 7B, 7C:
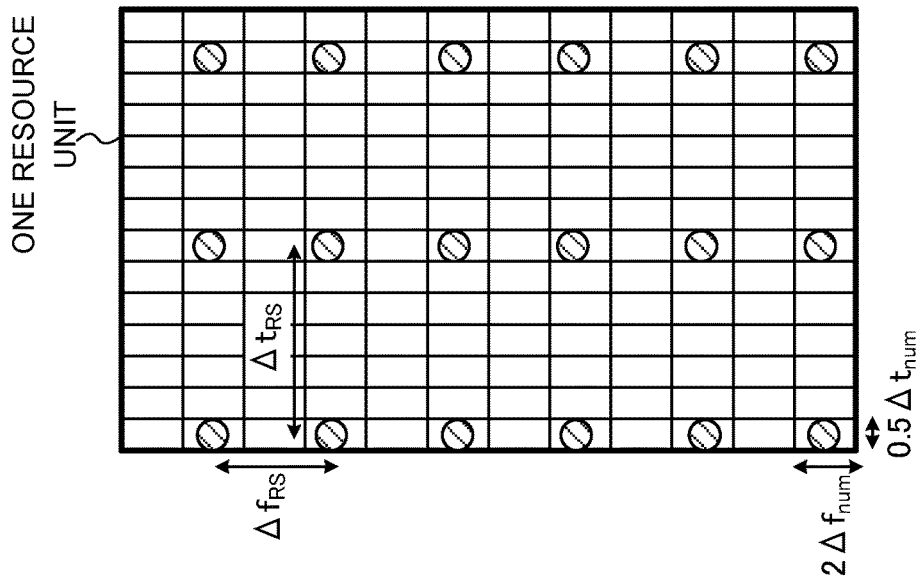
FIG. 7A to FIG. 7C provide diagrams to show other examples of arrangements of UL reference signals in a second example of format according to the first aspect.

For example, in the numerology grid shown in FIG. 7A, the subcarrier spacing is $2 \times \Delta f_{num}$, which is twice subcarrier spacing $\Delta f_{num}$ shown in FIG. 6A. Also, the symbol duration is $0.5 \times \Delta t_{num}$, which is ½ of symbol duration $\Delta t_{num}$ shown in FIG. 6A. That is, the bandwidth of each RE in FIG. 7A is twice as large as each RE in FIG. 6A, and the time duration of each RE in FIG. 7A is ½ of each RE in FIG. 6A.

Also, if the number of subcarriers and the number of symbols are the same in one resource unit, the bandwidth of one resource unit in FIG. 7A is twice that of one resource unit in FIG. 6A, and the time duration of one resource unit in FIG. 7A is ½ of one resource unit in FIG. 6A.

When a numerology grid like the one above is used, arrangement interval $\Delta f_{RS}$ of UL reference signals in the frequency direction of the RS grid shown in FIG. 7B matches two subcarriers in the numerology of FIG. 7A, and arrangement interval $\Delta t_{RS}$ in the time direction matches six symbols in the numerology of FIG. 7A. In this case, as shown in FIG. 7C, UL reference signals may be arranged in REs every two subcarriers and every six symbols.

FIG. 8 show an example of a UL reference signal format that uses a constant RS grid when a numerology grid that lengthens the symbol duration (that is, shortens (densifies) the subcarrier spacing) is used. In this case, $\Delta f_{num}$ and $\Delta t_{num}$ may be multiplied by predetermined coefficients.

In the numerology grid shown in FIG. 8A, the subcarrier spacing is $0.5 \times \Delta f_{num}$, which is ½ of subcarrier spacing $\Delta f_{num}$ shown in FIG. 6A. Also, the symbol duration is $2 \times \Delta t_{num}$, which is twice symbol duration $\Delta t_{num}$ shown in FIG. 6A. That is, the bandwidth of each RE in FIG. 8A is ½ of each RE in FIG. 6A, and the time duration of each RE in FIG. 8A is twice each RE in FIG. 8A.

Also, when the number of subcarriers and the number of symbols are the same in one resource unit, the bandwidth of one resource unit in FIG. 8A is ½ of one resource unit in FIG. 6A, and the time duration of one resource unit in FIG. 8A is twice that of one resource unit in FIG. 6A.

When a numerology grid like the one above is used, arrangement interval $\Delta f_{RS}$ of UL reference signals in the frequency direction of the RS grid shown in FIG. 8B matches eight subcarriers in the numerologies of FIG. 8A, and arrangement interval $\Delta t_{RS}$ in the time direction is close to one symbol in the numerology of FIG. 8A. In this case, as shown in FIG. 8C, UL reference signals may be arranged in REs every eight subcarriers and approximately every symbol.

As shown in FIG. 7 and FIG. 8, when different numerology grids are applied to the same RS grid, although arrangement intervals $\Delta f_{RS}$ and $\Delta t_{RS}$ in the frequency direction and the time direction in the RS grid stay constant, how often (every how many subcarriers and every how many symbols) UL reference signals are arranged varies.

Now, in the first and second examples of format, depending on the numerology grid and/or the RS grid employed in the radio base station, there is a possibility that UL reference signals cannot be arranged adequately even if the numerology grid and the RS grid are superimposed. Therefore, a method will be described below, whereby, when the numerology grid and the RS grid are superimposed, the RS grid or the REs where UL reference signals are arranged (mapped) are corrected so that UL reference signals are arranged adequately within the resource unit.

First Example of Correction

Figure 9:
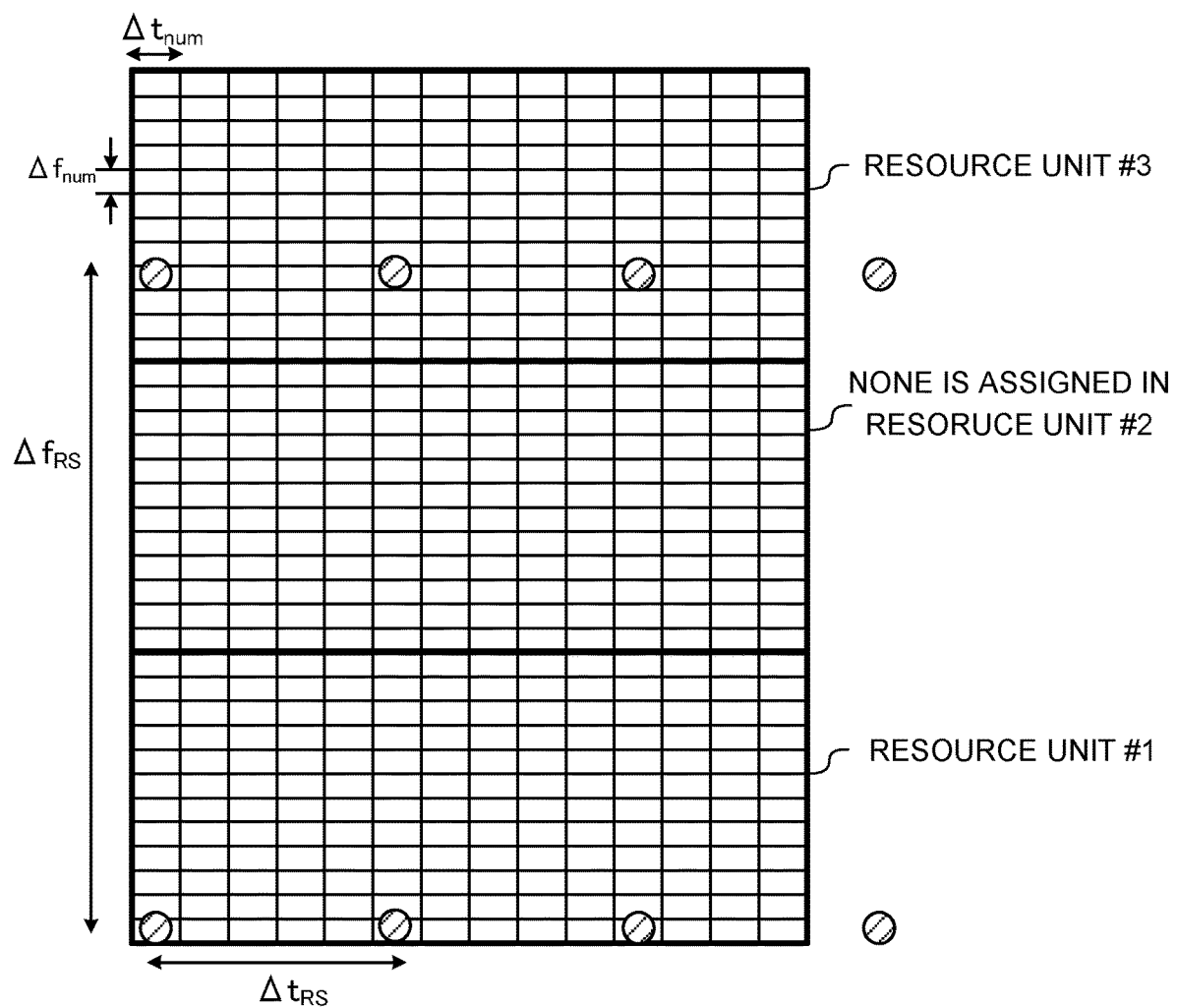
FIG. 9 is a diagram to show an example of a resource unit in which no UL reference signal is arranged.

As described above, if the format of UL reference signals is determined based on the numerology grid and the RS grid (when the numerology grid and the RS grid are superimposed), resource units in which no UL reference signal is arranged may be produced. FIG. 9 is a diagram to show an example of a resource unit in which no UL reference signal is arranged.

For example, as shown in FIG. 9, when arrangement interval $\Delta f_{RS}$ of the RS grid in the frequency direction is larger than the bandwidth of one resource unit (here, twelve subcarriers) indicated by the numerology grid, even if the numerology grid and the RS grid are superimposed on each other, no UL reference signal is arranged in resource unit #2. Likewise, even if arrangement interval $\Delta t_{RS}$ of the RS grid in the time direction is larger than the time duration of one resource unit (here, fourteen symbols) indicated by the numerology grid, resource units in which no UL reference signal is arranged may be produced.

If no UL reference signal is arranged in a resource unit, channel estimation cannot be performed for this resource unit, and thus the radio base station may not be capable of demodulating the UL signals (for example, the UL data channel) allocated in this resource unit. Also, since it is not possible to measure the channel quality of this resource unit, there is a risk that transmission control (for example, control of the modulation scheme, the coding rate, and so on) cannot be performed properly for the UL signals allocated in this resource unit.

Therefore, in the first example of correction, (1) the RS grid may be corrected or (2) the UL reference signal format may be corrected, so that at least one UL reference signal is allocated in each resource unit.

FIG. 10 provide diagrams to show the first example of correction. In FIG. 9 to FIG. 10, the values of $\Delta f_{num}$, $\Delta t_{num}$, $\Delta f_{rs}$ and $\Delta t_{rs}$ are assumed to be constant. Also, the numerology grids, the RS grids and the arrangements of UL reference signals shown in FIG. 9 to FIG. 10 are simply examples, and these are by no means limiting.

Figure 10A:
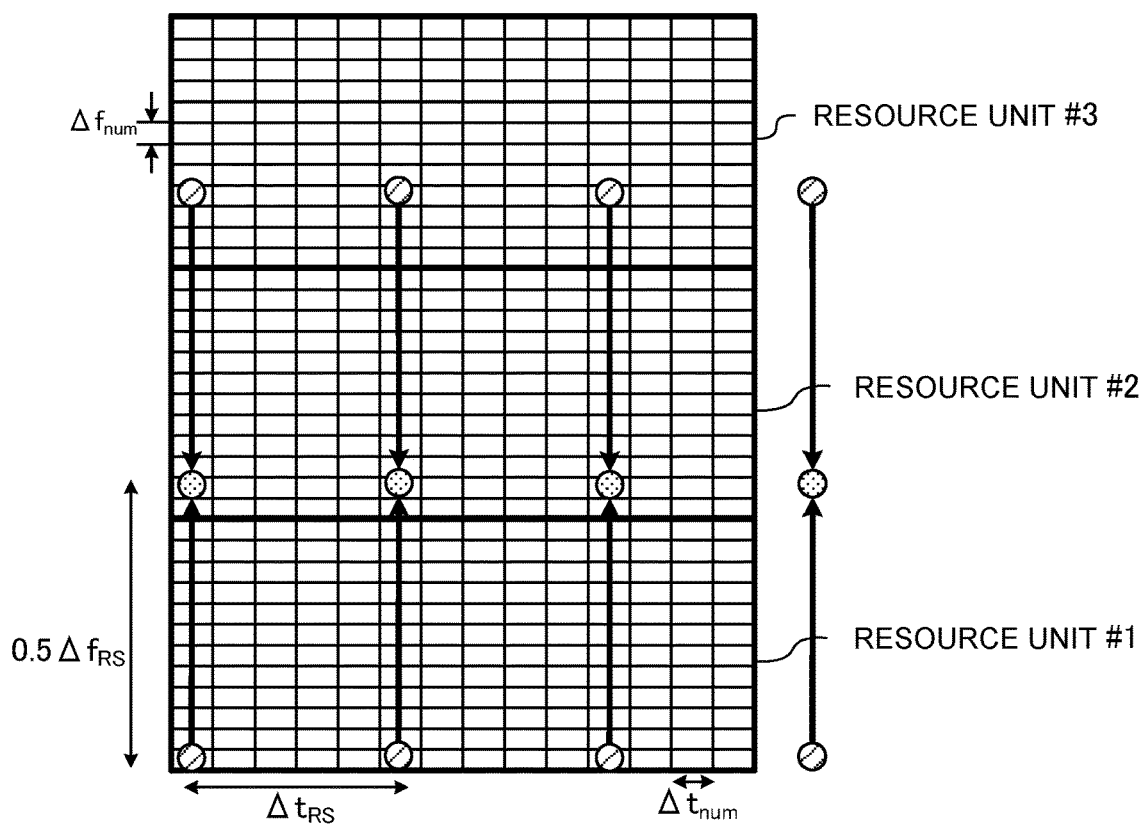
FIG. 10A and FIG. 10B provide diagrams to show a first example of correction of RS grid or arranged REs according to the first aspect.

FIG. 10A shows (1) the case of correcting the RS grid. To be more specific, based on subcarrier spacing $\Delta f_{num}$ and the number of subcarriers per resource unit (PRB), arrangement interval $\Delta f_{RS}$ of the RS grid in the frequency direction may be controlled (for example, reduced). Also, based on symbol duration $\Delta t_{num}$ and the number of symbols per resource unit (TTI,) arrangement interval $\Delta t_{RS}$ of the RS grid in the time direction may be controlled (for example, reduced).

For example, in FIG. 10A, based on subcarrier spacing $\Delta f_{num}$ and the bandwidth per resource unit defined with twelve subcarriers, arrangement interval $\Delta f_{RS}$ of the RS grid in the frequency direction is corrected to 0.5×$\Delta f_{RS}$. This allows UL reference signals to be placed in resource unit #2 as well.

Figure 10B:
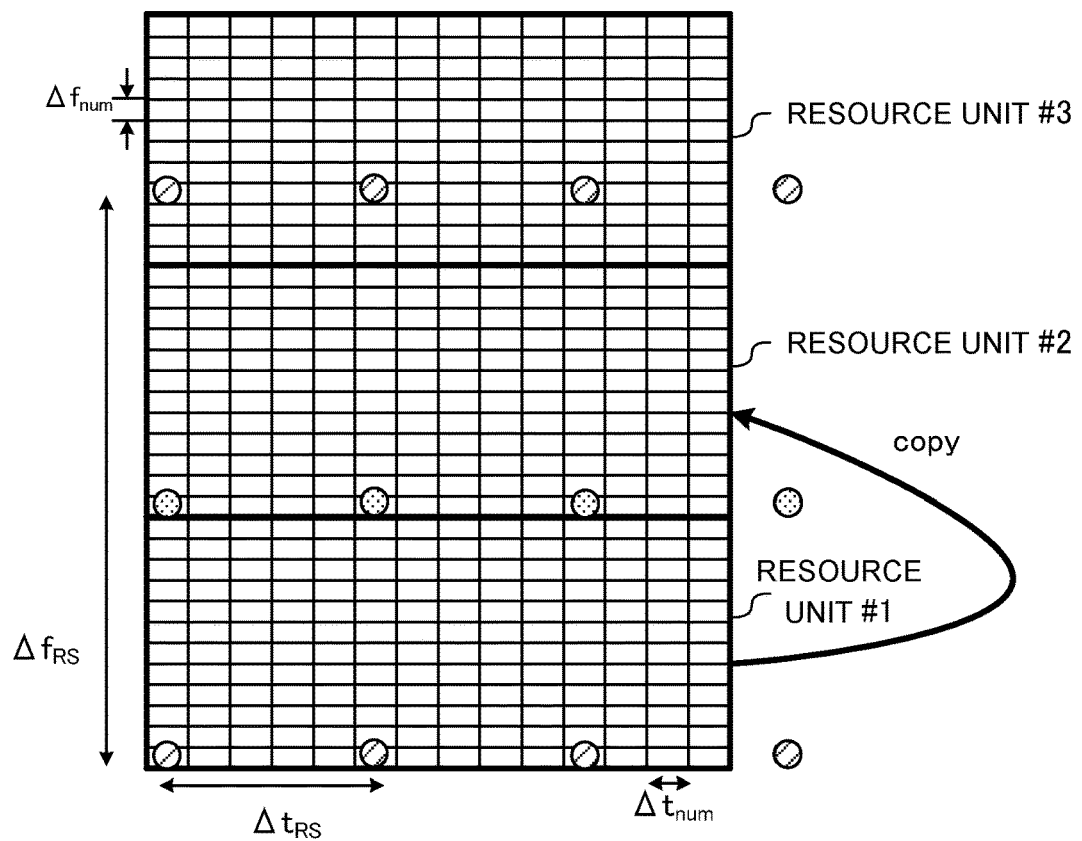

FIG. 10B shows (2) the case of correcting the REs where UL reference signals are arranged. To be more specific, by copying the UL reference signal format in adjacent resource units in the frequency direction or the time direction, UL reference signals may be arranged in at least one RE in every resource unit. For example, in FIG. 10B, the format of REs in resource unit #1 where UL reference signals are arranged is copied to adjacent resource unit #2 in the frequency direction. This allows UL reference signals to be placed in resource unit #2 as well.

Thus, if the format of UL reference signals is determined based on the numerology grid and the RS grid, (1) the RS grid or (2) the REs where UL reference signals are arranged may be corrected so that the number of UL reference signals to arrange and the positions to arrange UL reference signals are substantially equal. This can improve the accuracy of channel estimation and/or the accuracy of channel quality measurements.

Second Example of Correction

As described above, when the format of UL reference signals is determined based on the numerology grid and the RS grid (when the numerology grid and the RS grid are superimposed), multiple UL reference signals may be present per subcarrier and/or per symbol. However, multiple UL reference signals of the same antenna port cannot be arranged in a single RE.

Therefore, with a second example of correction, when the format of UL reference signals is determined by superimposing the numerology grid and the RS grid, if there are UL reference signals of the same antenna port, the RS grid may be corrected so that one UL reference signal is arranged on one or more REs. To be more specific, arrangement interval $\Delta f_{RS}$ of the RS grid in the frequency direction may be corrected to be equal to or greater than subcarrier spacing $\Delta f_{num}$. Furthermore, arrangement interval $\Delta t_{RS}$ of the RS grid in the time direction may be corrected to be equal to or more than symbol duration $\Delta t_{num}$.

Figure 11A:
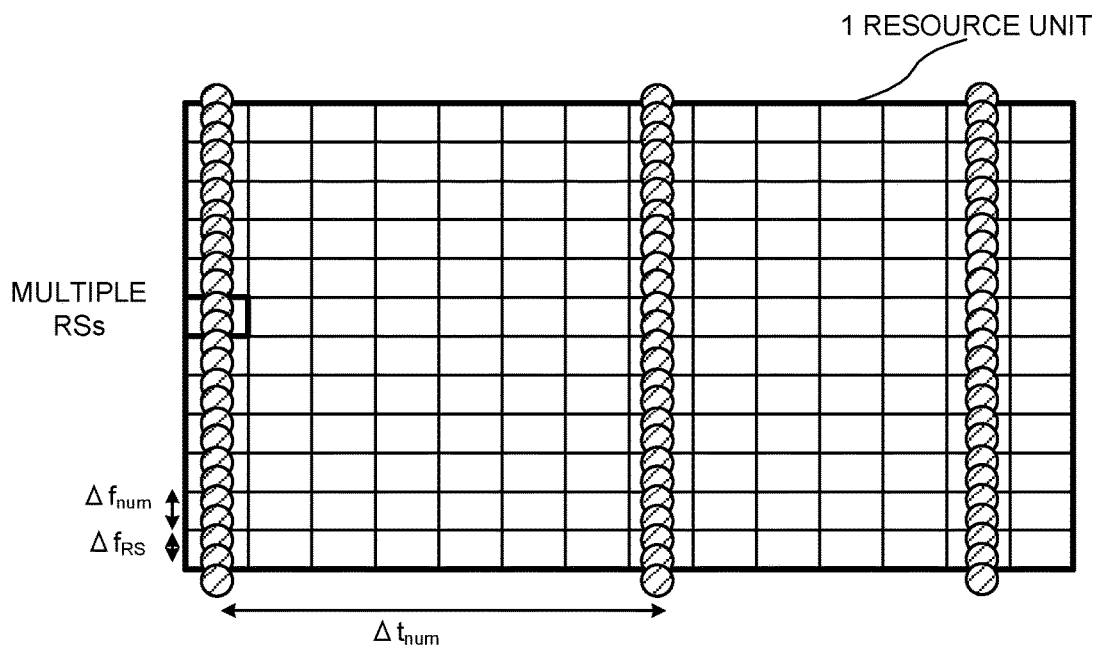
FIG. 11A and FIG. 11B provide diagrams to show a second example of correction of RS grid according to the first aspect.

FIG. 11 provide diagrams to show the second example of correction. Note that FIG. 11 show the format of UL reference signals of one antenna port as an example. FIG. 11A shows a case where arrangement interval $\Delta f_{RS}$ of the RS grid in the frequency direction is smaller than subcarrier spacing $\Delta f_{num}$. In this case, there can be multiple UL reference signals per subcarrier.

Figure 11B:
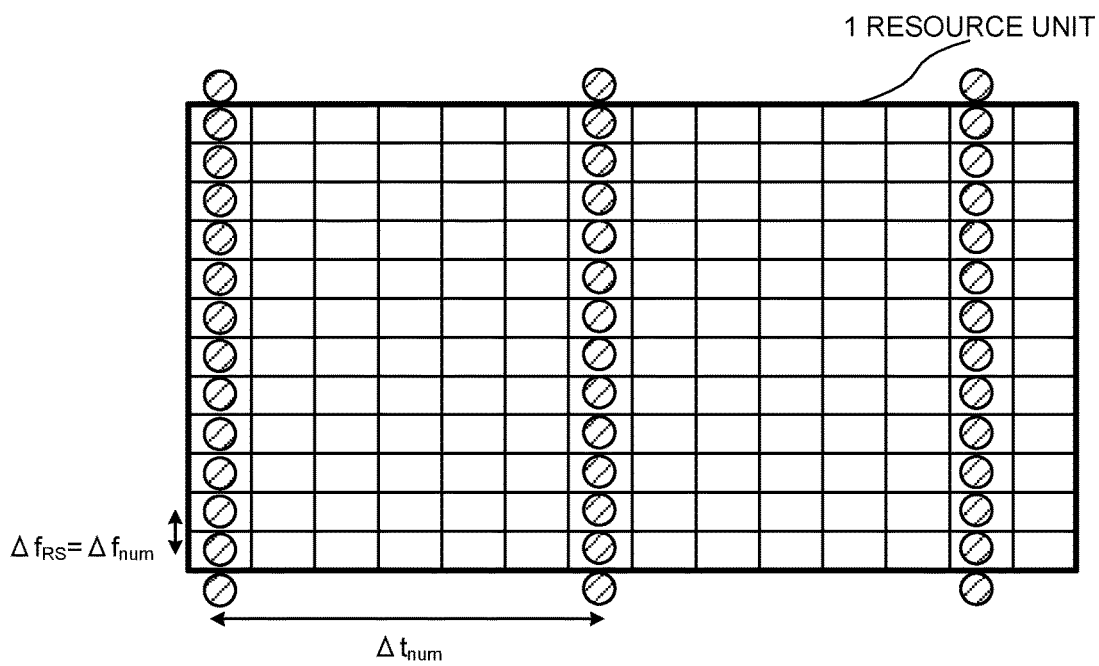

For this reason, in FIG. 11B, arrangement interval $\Delta f_{RS}$ of the RS grid in the frequency direction is corrected so as to be equal to subcarrier spacing $\Delta f_{num}$. This allows one UL reference signal to be arranged per subcarrier. Although not illustrated, it is obvious that arrangement interval $\Delta f_{RS}$ of the RS grid in the frequency direction may be corrected so as to be larger than subcarrier spacing $\Delta f_{num}$. Furthermore, when there are a plurality of UL reference signals per symbol, arrangement interval $\Delta t_{RS}$ of the RS grid in the time direction may be corrected to be equal to or more than symbol duration $\Delta t_{num}$.

Third Example of Correction

As described above, if the format of UL reference signals is determined based on the numerology grid and the RS grid (when the numerology grid and the RS grid are superimposed), cases might occur where there are multiple REs to be candidates for arranging UL reference signals (hereinafter referred to as "candidate REs") and the REs where UL reference signals are arranged cannot be specified on a unique basis.

Therefore, with a third example of correction, when superimposing the numerology grid and the RS grid produces a plurality of candidate REs, (1) at least one of these multiple candidate REs may be selected as an RE for arrangement, or (2) the RS grid may be corrected so that REs for arrangement can be uniquely specified.

FIG. 12 provide diagrams to show the third example of correction. FIG. 12A shows a case where $\Delta f_{RS}$ and $\Delta t_{RS}$ in the RS grid are not integral multiples of $\Delta f_{num}$ and $\Delta t_{num}$ of the numerology grid. In this case, as shown in FIG. 12A, there may be a plurality of RE candidates for arranging UL reference signals. For example, FIG. 12A shows (1) case 1 in which an RE where a UL reference signal is arranged in the RS grid can be uniquely specified, (2) case 2 in which two candidate REs are produced, and (3) case 3 in which four candidate REs are produced. In cases 2 and 3, the problem lies in which candidate REs UL reference signals should be arranged.

Figure 12A:
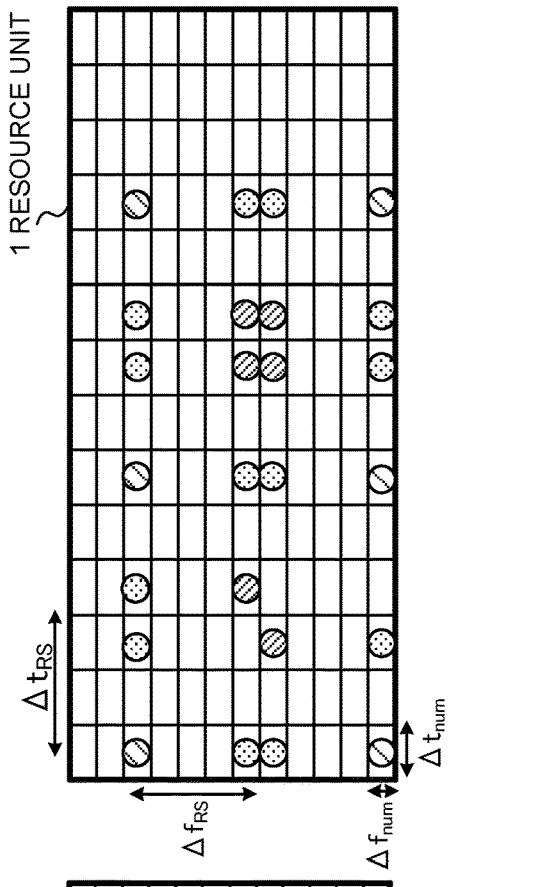
FIG. 12A to FIG. 12D provide diagrams to show a third example of correction of RS grid or arranged REs according to the first aspect.

In the case shown in FIG. 12A, (1) at least one of a plurality of candidate REs may be selected and a UL reference signal may be arranged (mapped) in the RE. To be more specific, as shown in FIG. 12B, it is possible to select, from these multiple candidate REs, a single candidate RE that makes arrangement interval $\Delta f_{RS}$ of the RS grid in the frequency direction and/or arrangement interval $\Delta t_{RS}$ in the time direction smaller or larger.

Figure 12C:
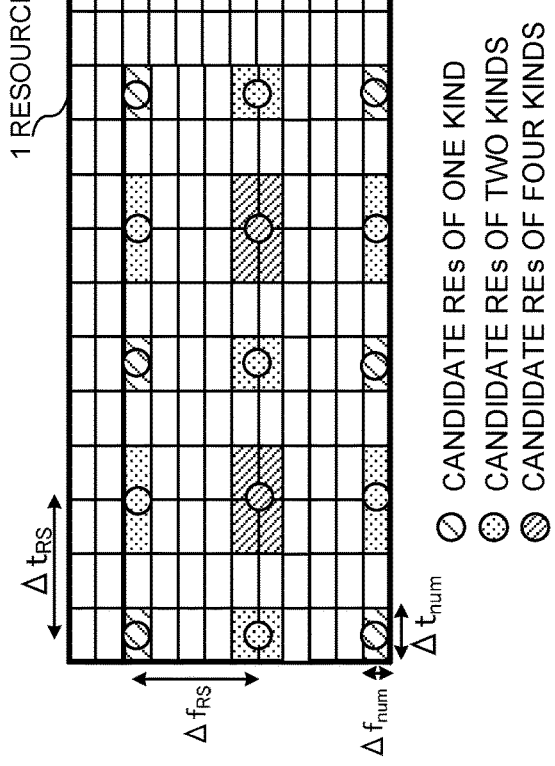
Figure 12D:
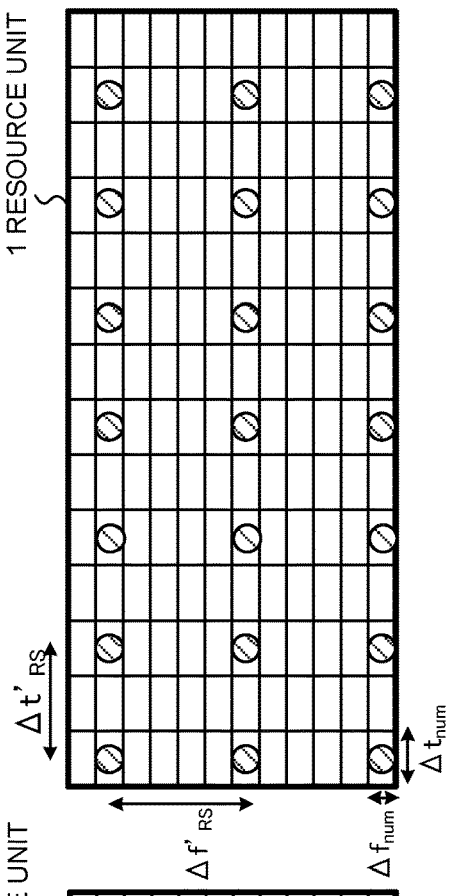
Figure 12B:
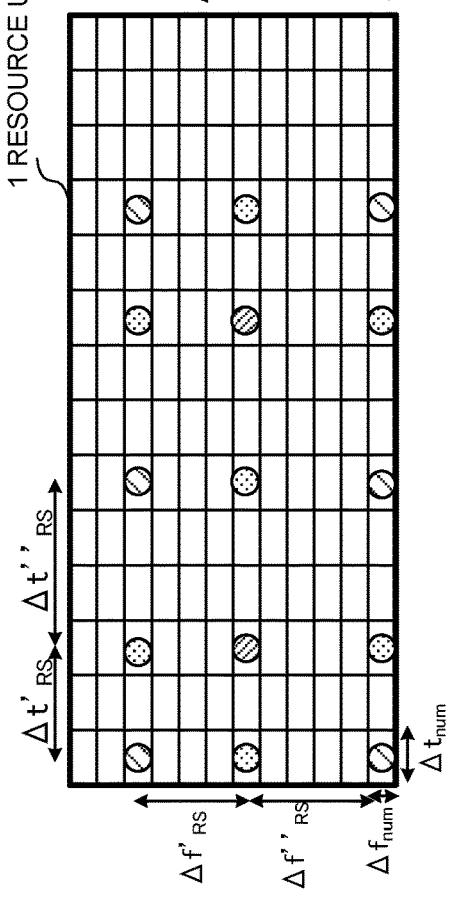

For example, in FIG. 12B, a candidate RE, where arrangement interval $\Delta f'_{RS}$ in one frequency direction is smaller than $\Delta f_{RS}$ in FIG. 12A and where arrangement interval $\Delta f''_{RS}$ in the other frequency direction is larger than $\Delta f_{RS}$ in FIG. 12A is selected. Furthermore, a candidate RE where arrangement interval $\Delta t'_{RS}$ in one time direction is smaller than $\Delta t_{RS}$ in FIG. 11A and where arrangement interval $\Delta t''_{RS}$ in the other time direction is larger than $\Delta t_{RS}$ in FIG. 12A is selected.

Alternatively, as shown in FIG. 12C, UL reference signals may be placed in some or all of the plurality of candidate REs. For example, FIG. 12C shows that, in case 2 where two candidate REs are produced, UL reference signals may be arranged in one candidate RE, or UL reference signals may be arranged on both candidate REs. Also in case 3 where four candidate REs are produced, cases might occur where UL reference signals are arranged in two candidate REs or where UL reference signals are arranged in all of the four candidate REs. In which candidate REs UL reference signals should be arranged may be determined in advance, or may be determined following predetermined rules.

Alternatively, as shown in FIG. 12D, (2) the RS grid may be corrected. To be more specific, the arrangement REs may be uniquely specified by making arrangement interval $\Delta f_{RS}$ of the RS grid in the frequency direction and/or arrangement interval $\Delta t_{RS}$ of the RS grid in the time direction smaller or larger. For example, in FIG. 12D, arrangement intervals $\Delta f'_{RS}$ and $\Delta t'_{RS}$ of the RS grid in the frequency direction and the time direction are corrected to be integral multiples of $\Delta f_{num}$ and $\Delta t_{num}$, or corrected so that the arrangement REs are uniquely specified. By this means, it is possible to prevent multiple candidate REs from being produced.

Fourth Example of Correction

As described above, the problem when the format of UL reference signals is determined based on the numerology grid and the RS grid lies in with reference to which symbol and/or subcarrier the numerology grid and the RS grid should be superimposed. To be more specific, when arranging one or more channels (for example, UL data channel (PUSCH: Physical Uplink Shared Channel), UL control channel (PUCCH: Physical Uplink Control Channel), PRACH (Physical Random Access Channel) with different uses are arranged within a resource unit indicated by the numerology grid, the problem is how to superimpose the RS grid on the numerology grid.

Therefore, with a fourth example of correction, when the format of UL reference signals is determined based on the numerology grid and the RS grid, the configuration of the RS grid may be controlled based on the channel placed in the resource unit. To be more specific, the symbol and/or the subcarrier to be the base upon superimposition on the numerology grid (hereinafter referred to as the "base symbol" and/or the "base subcarrier") may be determined based on the channel arranged in the resource unit.

FIG. 13 provide diagrams to show the fourth example of correction. Note that FIG. 13 show cases, as examples, where channels (for example, PUCCH) other than the PUSCH are arranged in the resource unit. In FIG. 13, a channel other than the PUSCH is arranged in a predetermined symbol (here, the fifth symbol) in the resource unit, over all subcarriers.

Figure 13A:
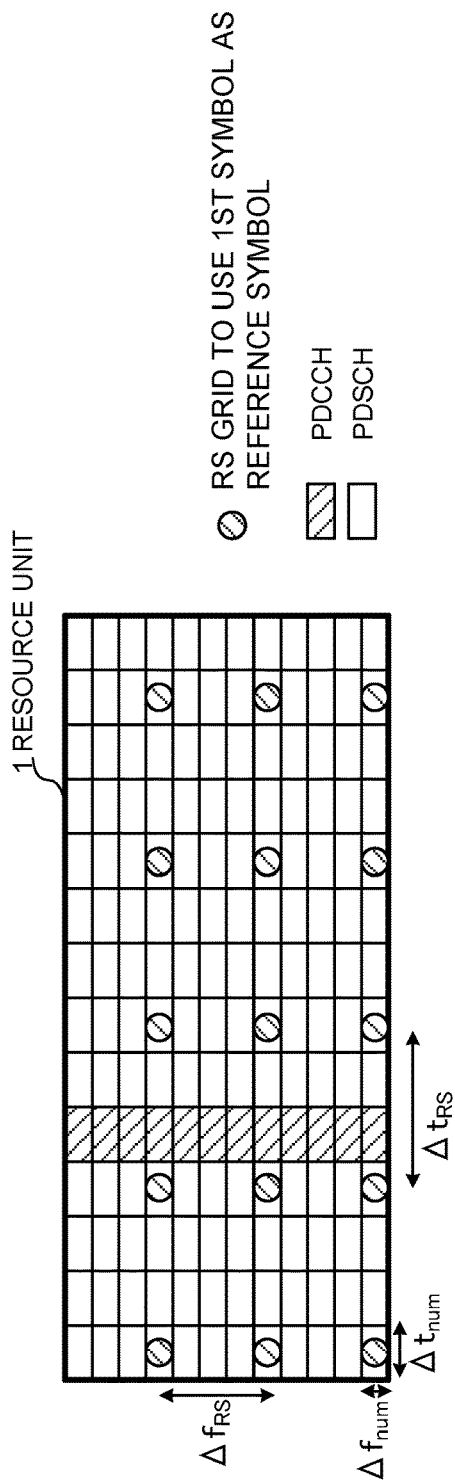
FIG. 13A and FIG. 13B provide diagrams to show a fourth example of correction of RS grid or arranged REs according to the first aspect.

In FIG. 13A, regardless of whether or not there are channels other than the PUSCH, the RS grid is superimposed on the numerology grind based on the first symbol in the resource unit and the subcarrier of the lowest frequency (or the subcarrier of the highest frequency) in the resource unit.

In FIG. 13A, if REs where UL reference signals are arranged collide with a channel other than the PUSCH, $\Delta t_{RS}$ of the RS grid may be corrected. Also, although not illustrated, assuming that a channel other than the PUSCH is arranged in a specific subcarrier in the resource unit, over all symbols, if the REs in which UL reference signals are arranged collide with this channel, $\Delta f_{RS}$ of the RS grid may be corrected.

Figure 13B:
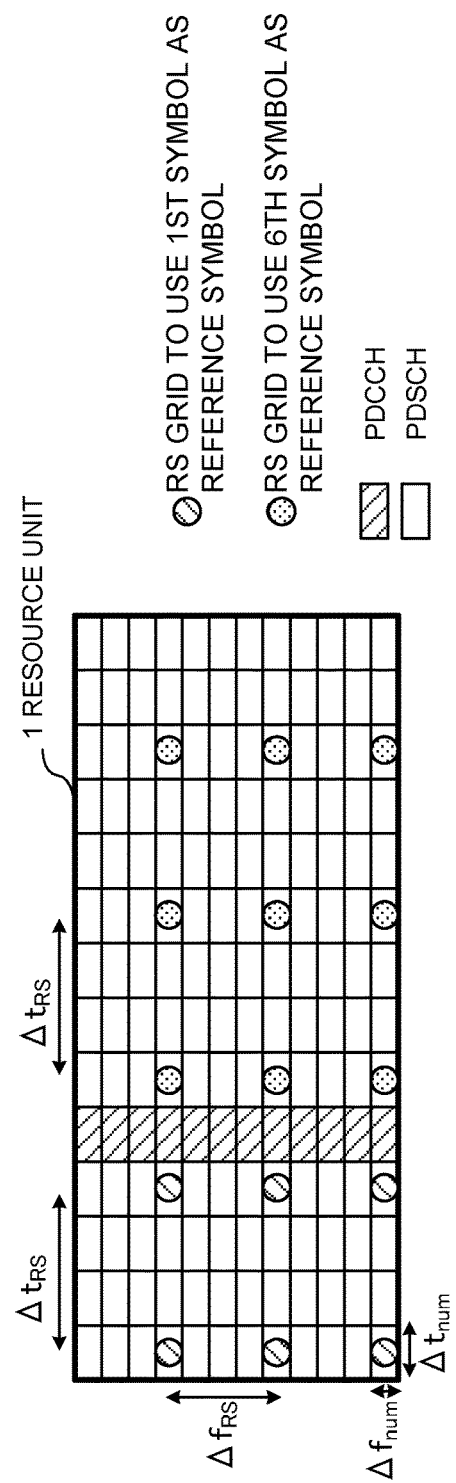

Referring to FIG. 13B, a plurality of RS grids having different base symbols are configured in the resource unit based on symbols where a channel other than the PUSCH is arranged. To be more specific, before a symbol in which a channel other than the PUSCH is arranged, an RS grid that is based on the first symbol in the resource unit is used, whereas, after a symbol in which a channel other than the PUSCH is arranged, an RS grid that is based on the sixth symbol (the symbol next to the symbol where a channel other than the PUSCH is arranged) is used.

As shown in FIG. 13B, when a plurality of RS grids having different base symbols are superimposed in consideration of a channel other than the PUSCH, the REs in which UL reference signals are arranged can be prevented from colliding with the channel other than the PUSCH. Although not illustrated, a plurality of RS grids having different base symbols and/or different base subcarriers may be configured taking channels other than the PUSCH into consideration.

Fifth Example of Correction

As described above, when the format of UL reference signals is determined based on the numerology grid and the RS grid, it is desirable to optimize the format of UL reference signals based on the number of REs in one resource unit, and so on.

Therefore, with a fifth example of correction, when the format of UL reference signals is determined by superposing the numerology grid and the RS grid, the REs to arrange UL reference signals may be changed. To be more specific, REs for arranging UL reference signals may be added, at least one of the REs where UL reference signals are arranged may be removed (punctured), or at least one of the REs where UL reference signals are arranged may be shifted in the frequency direction and/or the time direction.

FIG. 14 provide diagrams to show the fifth example of correction. FIG. 14A shows the case where the numerology grid and the RS grid are superimposed based on the first symbol and the subcarrier of the lowest frequency (or the highest frequency).

As shown in FIG. 14B, in addition to the REs for arranging UL reference signals determined in FIG. 14A, at least one arranging RE may be added. For example, in FIG. 14B, three arranging REs are added in the last symbol in the resource unit.

Alternatively, as shown in FIG. 14C, at least one of the REs for arranging UL reference signals determined in FIG. 14A may be shifted in the frequency direction and/or the time direction. For example, in FIG. 14C, three arranging REs are shifted in the frequency direction.

Alternatively, as shown in FIG. 14D, at least one of the REs for arranging UL reference signals determined in FIG. 14A may be removed. For example, in FIG. 14D, six arranging REs are removed.

By this means, the number of UL reference signals to arrange and/or the arrangement pattern of UL reference signals can be optimized, depending on the number of REs in the resource unit, by changing the REs for arranging the UL reference signal determined by superimposing the numerology grid and the RS grid. Note that the addition, shifting and removal of REs for arrangement shown in FIGS. 14B, 14C and 14D may be applied independently, or at least one of these may be combined and applied.

Furthermore, the above-described first correction to the fifth correction can be performed on the user terminal side. Alternatively, a structure may be adopted in which, after the above-described first correction to the fifth correction are made on the radio base station side, information about the corrected mapping positions of UL reference signals and so on is reported to the user terminal.

Second Aspect

With reference to a second aspect of the present invention, the generation of sequences of UL reference signals that are determined to be arranged in REs as described above will be described. The second example can be combined with the first example described above.

UL reference signals may be generated based on at least one of cell identification information, user terminal identification information, scrambling identification information, slot numbers and higher layer control information.

Here, the cell identification information is information for identifying a cell, and may include at least one of a physical cell ID (PCID: Physical Cell Identifier) and a virtual cell ID (VCID: Virtual Cell Identifier), for example. Furthermore, the user terminal identification information is information for identifying the user terminal, and may include, for example, UE-ID (User Equipment Identifier) and RNTI (Radio Network Temporary Identifier). In addition, higher layer control information refers to control information that is configured through higher layer signaling.

To be more specific, PN sequences (Pseudo-Noise sequences) (also referred to as "pseudo-random sequences" and so on) that are initialized (that is made a sequence seed) based on at least one of cell identification information, user terminal identification information, scrambling identification information, slot numbers and higher layer control information may be generated, and UL reference signals may be generated based on these PN sequences.

Alternatively, Zadoff-Chu sequences that are initialized based on at least one of cell identification information, user terminal identification information, scrambling identification information, slot numbers and higher layer control information may be generated, and UL reference signals may be generated based on these Zadoff-Chu sequences. Note that the sequences to use to generate UL reference signals are not limited to PN sequences, Zadoff-Chu sequences and so on, and may be sequences called by other names.

Third Aspect

According to a third aspect of the present invention, the mapping of DM-RSs, which are used as UL reference signals, will be explained. The third aspect can be combined with the first and/or the second aspect. To be more specific, the DM-RS format that will be described with reference to the third aspect may be determined (and corrected) as described with the first aspect. Also, the DM-RS may be generated as described with the second aspect.

Here, the DM-RS is a reference signal that is used to demodulate the UL data channel (for example, PUSCH) and is used for channel estimation. The DM-RS may be referred to as a "demodulation reference signal," a "channel estimation reference signal," and so on.

Figure 15A:
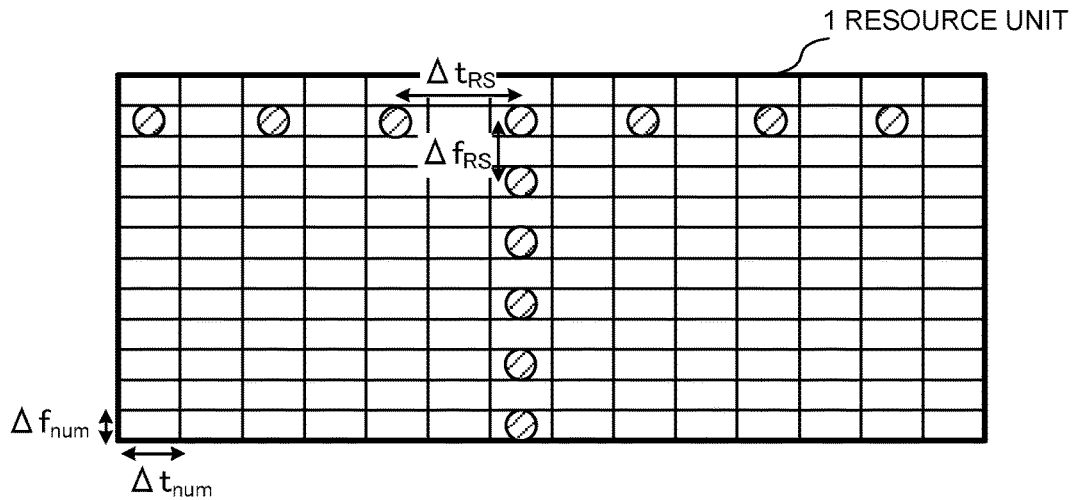
FIGS. 15A to 15C provide diagrams to show a first example of DM-RS mapping, according to a third aspect of the present invention.

Examples of DM-RS mapping (arrangement) will be explained with reference to FIG. 15 to FIG. 17. In FIG. 15 to FIG. 17, the REs where DM-RSs are mapped (mapping REs) are determined based on the numerology grid defined by $\Delta f_{num}$ and $\Delta t_{num}$ and the RS grid defined by $\Delta f_{RS}$ and $\Delta t_{RS}$.

Furthermore, in FIG. 15 to FIG. 17, a specific subcarrier may be specified based on the subcarrier index, and a specific symbol may be specified based on the symbol index. When the RS grid is represented by a predetermined equation, the REs in which the DM-RS is arranged may be specified based on the pertaining subcarrier index and/or symbol index.

First Example of Mapping

FIG. 15 provide diagrams to show a first example of DM-RS mapping. In FIG. 15, DM-RSs are mapped to REs on the RS grid in a specific subcarrier and to REs on the RS grid in specific symbols.

Figure 15B:
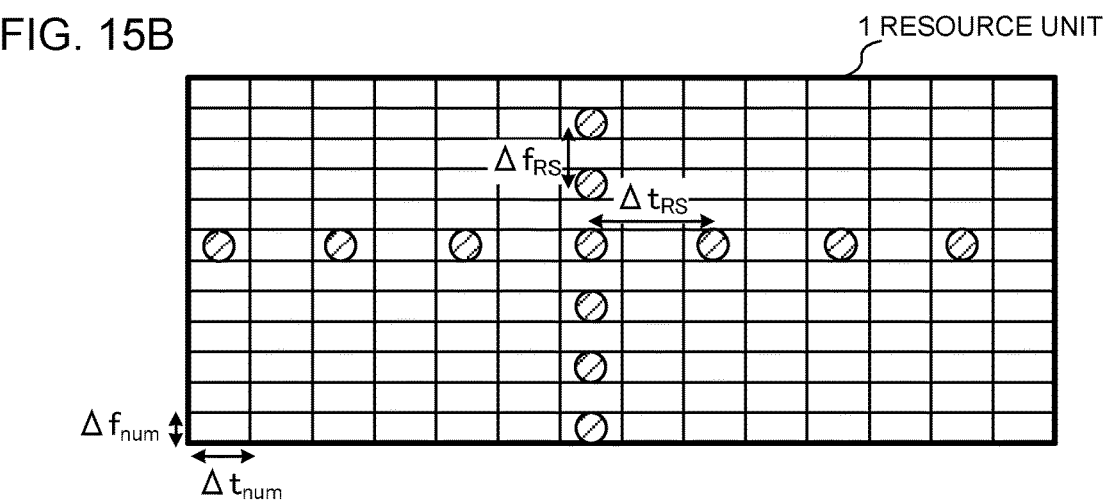
Figure 15C:
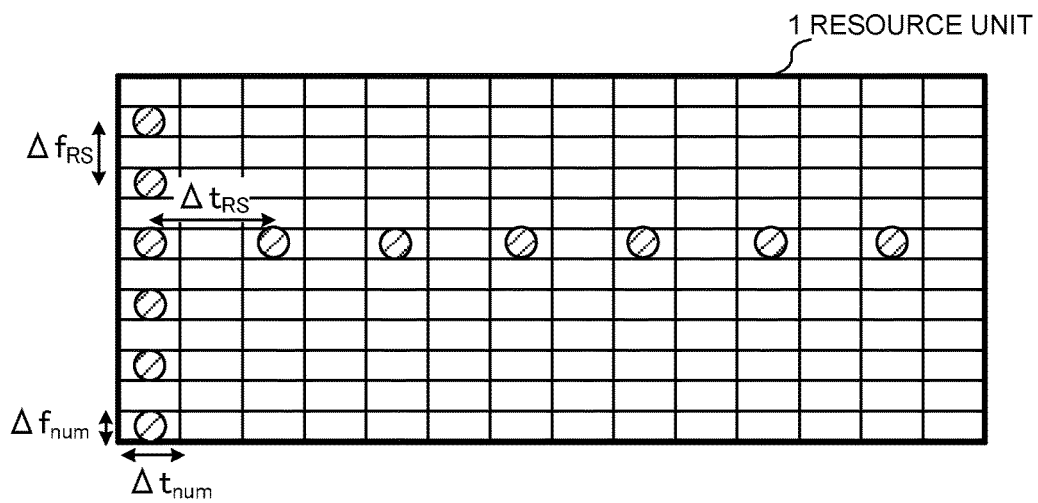
Figure 16A:
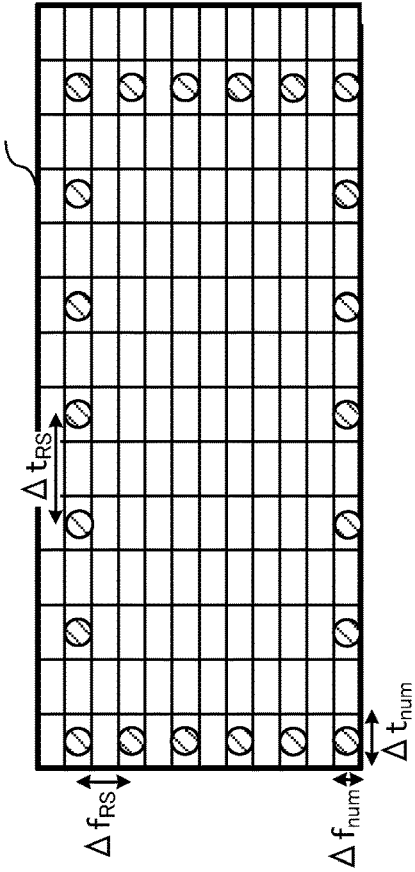
FIGS. 16A to 16C provide diagrams to show a second example of DM-RS mapping, according to the third aspect.
Figure 16C:
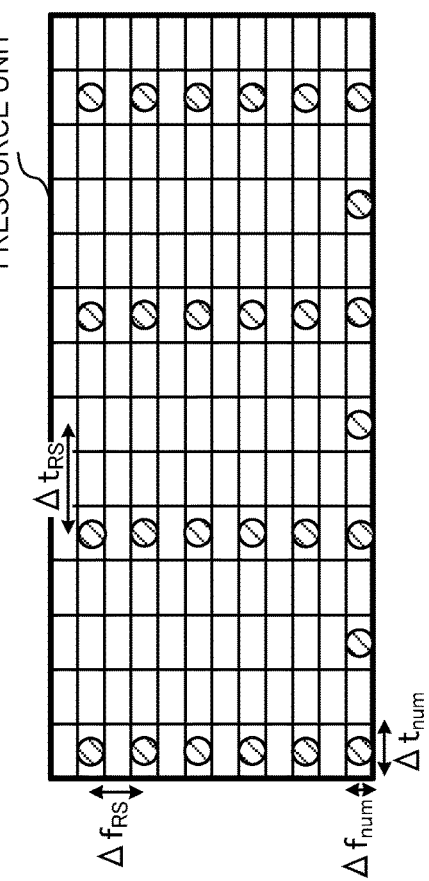
Figure 16B:
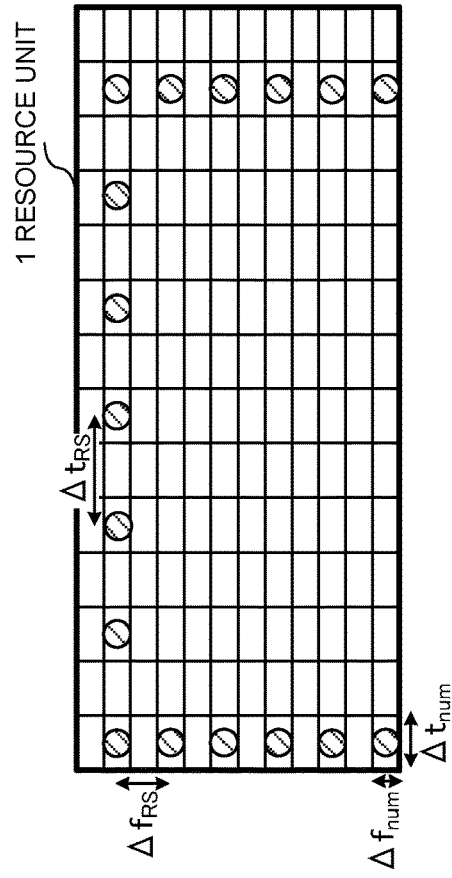

For example, the specific subcarrier to which DM-RSs are mapped may be the subcarrier of (or near) the highest frequency or the subcarrier of (or near) the lowest frequency on the RS grid in one resource unit (FIG. 15A) or may be the subcarrier of (or near) the center frequency on the RS grid (see FIG. 15B and FIG. 15C). Also, the specific symbols may be symbols at (near) the beginning of the RS grid (FIG. 15C), or may be symbols at (near) the center of the RS grid (see FIG. 15A and FIG. 15B). Although not illustrated, the specific symbol may be (near) the last symbol on the RS grid.

As shown in FIG. 15A to FIG. 15C, when DM-RSs are mapped to REs of a particular subcarrier and particular symbols on the RS grid (also referred to as "T-shaped mapping"), it is possible to support the maximum delay spread with multiple DM-RSs on the specific sub carrier, support the maximum Doppler frequency with multiple DM-RSs on the specific symbols, and reduce the DM-RS-induced overhead in the resource unit.

Second Example of Mapping

FIG. 16 provide diagrams to show a second example of DM-RS mapping. FIG. 16 show cases where a plurality of specific subcarriers and/or a plurality of specific symbols are used.

Figure 16D:
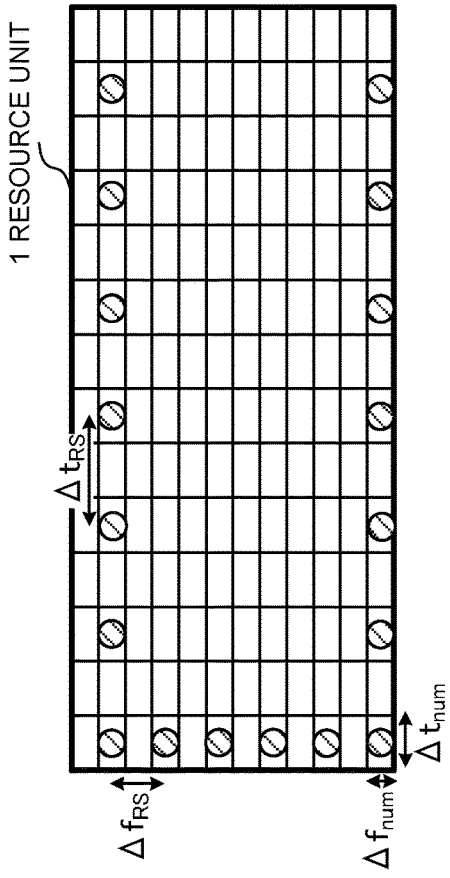
Figure 17:
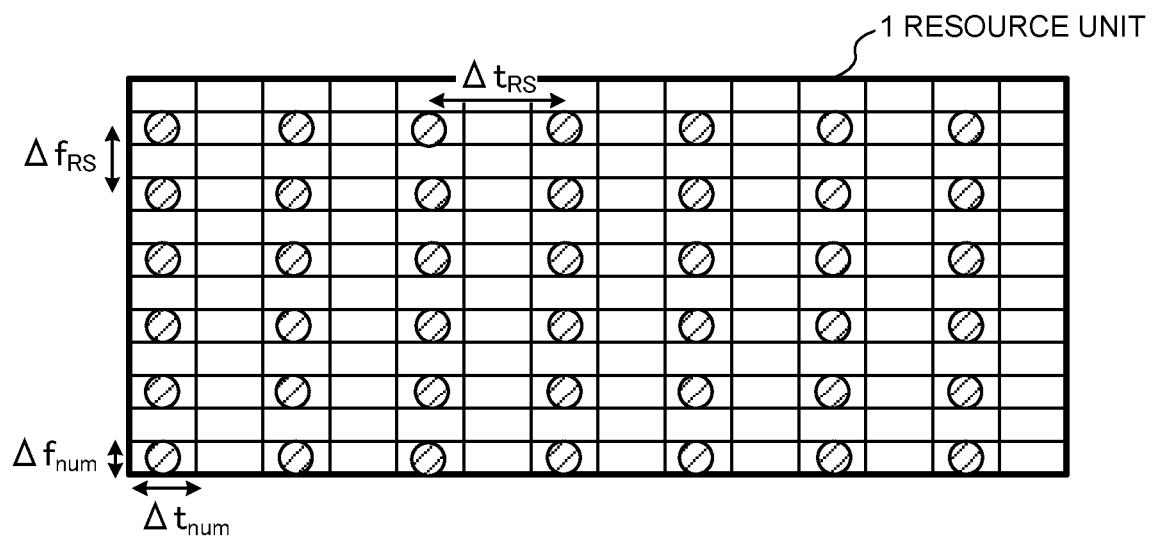
FIG. 17 is a diagram to show a third example of DM-RS mapping according to the third aspect.

For example, the specific symbols may be the first symbol and the last symbol on the RS grid in one resource unit (FIG. 16A and FIG. 16C), or may be symbols at predetermined intervals on the RS grid (FIG. 16D). Also, the specific subcarriers may be the subcarrier of (or near) the highest frequency on the RS grid and/or subcarrier of (or near) the lowest frequency (FIG. 16C and FIG. 16D). Although not illustrated, the subcarrier at (near) the center frequency may be a specific subcarrier as well.

As shown in FIG. 16A to FIG. 16D, if DM-RSs are mapped to REs of one or more specific subcarriers and one or more specific symbols on the RS grid (also referred to as "Π-shaped mapping"), it is possible to support the maximum delay spread with multiple DM-RSs on the specific subcarriers, support the maximum Doppler frequency with multiple DM-RSs on the specific symbols, and reduce the DM-RS-induced overhead in the resource unit. Also, compared with the above-mentioned T-shaped mapping, the accuracy of channel estimation in the frequency direction and/or the time direction can be improved.

Third Example of Mapping

FIG. 17 is a diagram to show a third example of DM-RS mapping. FIG. 17 shows a case where there are a plurality of specific subcarriers and specific symbols. For example, in FIG. 17, all subcarriers and all symbols on the RS grid are specific subcarriers and specific symbols where DM-RSs are to be mapped.

As shown in FIG. 17, when DM-RSs are mapped to REs in multiple subcarriers and multiple symbols on the RS grid in one resource unit (also referred to as "grid-patterned mapping"), the maximum delay spread and maximum Doppler Frequency can be supported. Moreover, although the overhead per resource unit increases compared with the above-described T-shaped mapping or Π-shaped mapping, the accuracy of channel estimation can be improved.

Fourth Example of Mapping

Figure 18A:
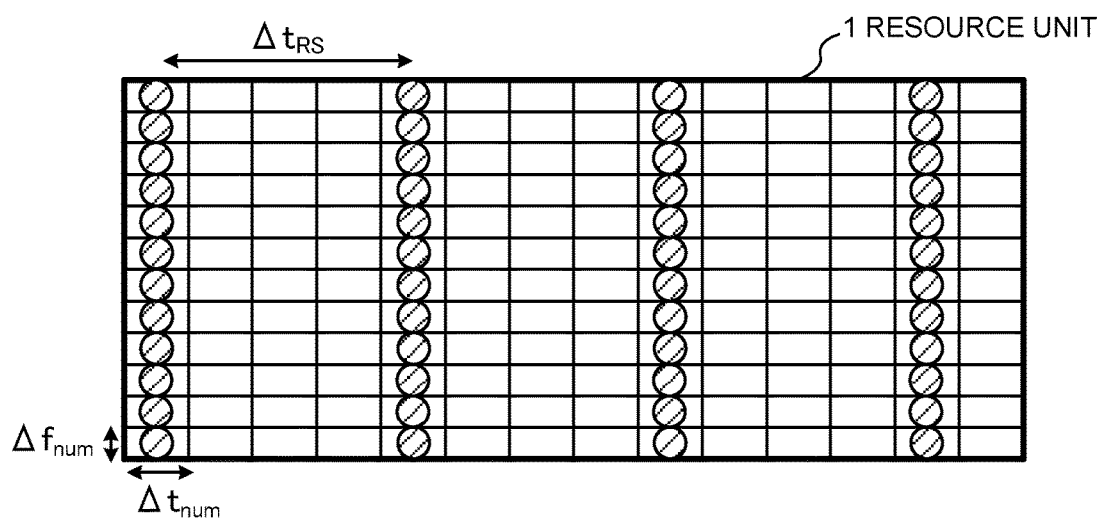
FIGS. 18A and 18B provide diagrams to show a forth example of DM-RS mapping, according to the third aspect.

FIG. 18 provide diagrams to show a fourth example of DM-RS mapping. FIG. 18A shows a case where DM-RSs are mapped to all the subcarriers used by the user terminal. In this case, as far as the configuration of the DM-RS is concerned, only the spacing in the time direction ($\Delta t_{RS}$) may be configured, and $\Delta f_{RS}$ needs not be configured. Also, in FIG. 18, DM-RSs can be mapped to each subcarrier as in existing LTE systems.

As shown in FIG. 18A, when DM-RSs are mapped per subcarrier in one unit (also referred to as "I-shaped mapping"), in comparison to the T-shaped mapped or Π-shaped mapping described above, although the overhead per resource unit might increase, the accuracy of channel estimation can be improved. In addition, the radio base station only needs to report $\Delta t_{RS}$ to the user terminal (and does not have to report $\Delta f_{RS}$), so that it is possible to reduce the signaling overhead.

Figure 18B:
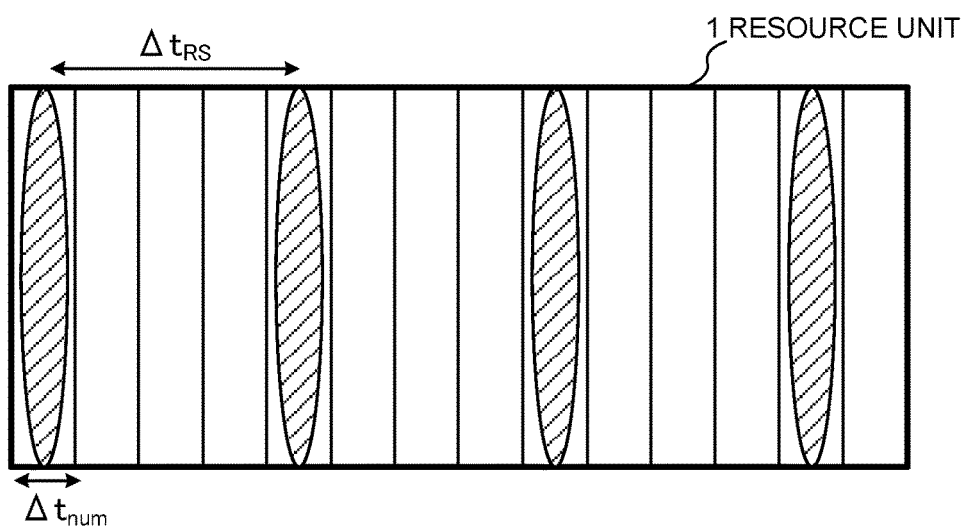

As another form of the fourth example of mapping of DM-RSs, as shown in FIG. 18B, DM-RSs may be mapped over the entire band used by the user terminal. In this case, it is sufficient to configure only the spacing in the time direction ($\Delta t_{RS}$) in the entire band, and it is not necessary to configure MRS.

FIG. 15 to FIG. 18 show examples of DM-RS mapping for one antenna port. When multiple antenna ports are used, DM-RSs of each antenna port can be multiplexed using at least one of CDM, FDM and TDM.

Note that which example of mapping described with the third aspect is to be applied may be determined in advance, may be configured through higher layer signaling, or may be selected dynamically and reported to the user terminal via an L1/L2 control channel.

Also, DM-RSs, to which the above-described examples of mapping are applied, may be transmitted in subcarriers and/or symbols where data (PUSCH) is mapped, or may be transmitted in subcarriers and/or symbols where the PUSCH is not mapped, for example. For example, when data is transmitted in the fourth and subsequent symbols in a resource unit, DM-RSs may be transmitted in the first symbol.

Fourth Aspect

With a fourth aspect of the present invention, a method of configuring random access preambles and RS grids will be described.

As for random access preambles, it is preferable to determine optimal configurations according to the Doppler frequency and the delay spread, as with the RS grid. Accordingly, the parameters of random access preambles and the configuration of the RS grid can be defined in combination.

For example, the parameters of random access preambles (at least one of the number of sequences, the amount of cyclic shift, the number of root sequences, the CP duration and so on) and the RS grid configuration can be defined in combination. As an example, at least one of the configurations of random access preambles and RS grids, the configurations of root sequences and RS grids, and the configurations of the CP duration in random access preambles and RS grids may be determined as a set.

The radio base station can report the parameters of random access preambles configured as a set with the RS grid to the user terminal using higher layer signaling and so on. At this time, the radio base station may report information about the RS grid and the parameters of random access preambles to the user terminal at the same timing via higher layer signaling and so on, or may report at different timing (in different signals and/or channels).

Fifth Aspect

With a fifth aspect of the present invention, the UL transmission power control in the user terminal will be explained.

As described above, when UL reference signals are allocated using numerology grids and RS grids, cases might occur where the quantity (proportion) of reference signals included in a transmission time interval (TTI) for UL transmission changes depending on what type of grid is selected. In such cases, the user terminal may be configured to control the UL transmission power based on the amount of UL reference signals allocated to a TTI (for example, a subframe).

For example, the user terminal configures the UL transmission power (for example, UL reference signal transmission power per RE) to be small as the amount (proportion) of UL reference signals transmitted in one TTI increases. On the other hand, the user terminal can configure the UL transmission power (for example, the UL reference signal transmission power per RE) to be large as the amount of UL reference signals transmitted in one TTI decreases. In this case, one or more transmission power offset values can be configured depending on the amount (proportion) of UL reference signals transmitted in one TTI, and the user terminal can control the UL transmission power by selecting a predetermined offset value according to the amount of UL reference signals.

Thus, by controlling UL transmission power depending on the amount (proportion) of UL reference signals, even when the amount of UL reference signals to transmit changes, transmission power to apply to other UL signals (for example, an uplink shared channel and/or an uplink control channel) can be secured.

Radio Communication System

Now, the structure of a radio communication system according to the present embodiment will be described below. In this radio communication system, each radio communication method according to the above-described embodiments is employed. Note that the radio communication method according to each embodiment may be used alone or may be used in combination.

Figure 19:
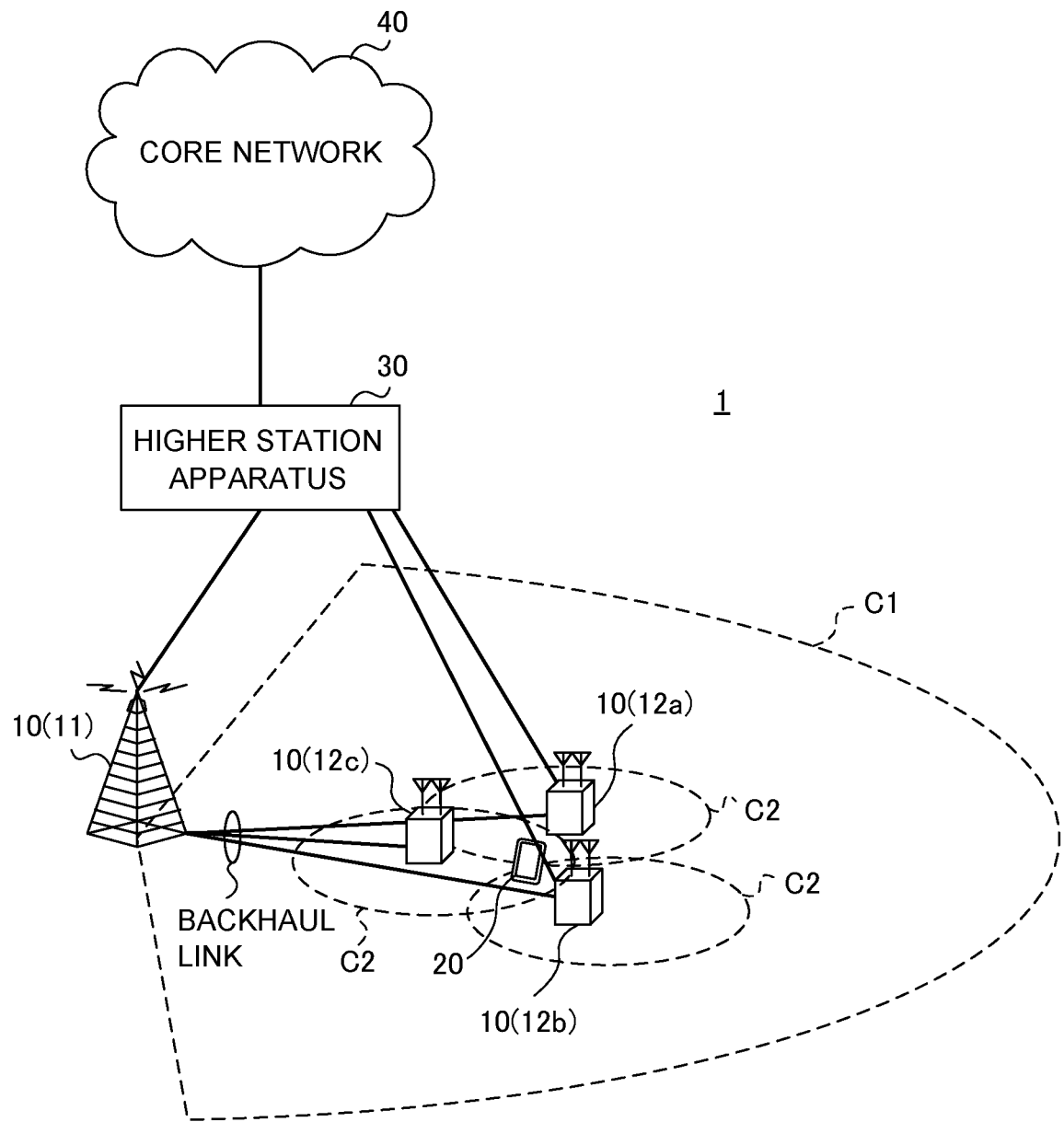
FIG. 19 is a diagram to show an example of a schematic structure of a radio communication system according to the present embodiment.

FIG. 19 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "5G+," "FRA (Future Radio Access)" and so on.

The radio communication system 1 shown in FIG. 19 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are applied to some of a plurality of cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and OFDMA may be used in the uplink.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement signals (ACK/NACK) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Uplink control information (UCI: Uplink Control Information), including at least one of delivery acknowledgment information (ACK/NACK) and radio quality information (CQI), is transmitted by the PUSCH or the PUCCH. By means of the PRACH, random access preambles for establishing connections with cells are communicated.

Radio Base Station

Figure 20:
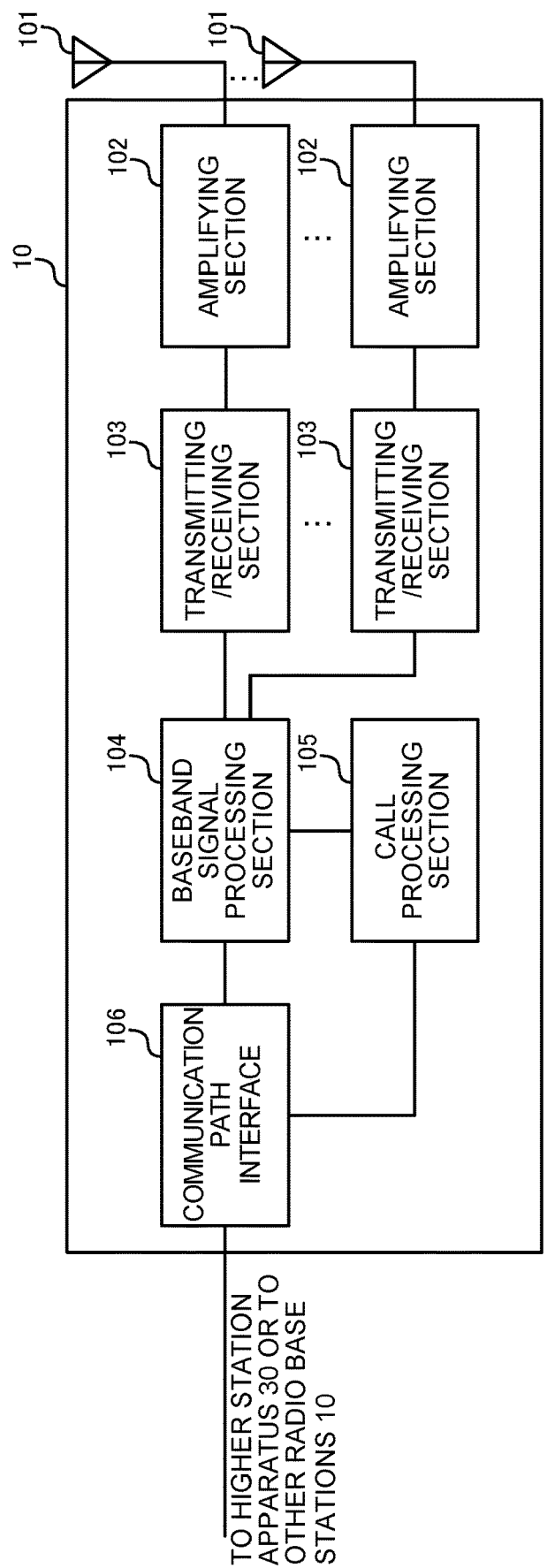
FIG. 20 is a diagram to show an example of an overall structure of a radio base station according to the present embodiment.

FIG. 20 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections (transmission section) 103 receive the UL reference signals transmitted from the user terminal. The UL reference signals are mapped to at least one resource element based on a first grid (for example, a numerology grid) that defines each resource element composed of a subcarrier and a symbol, and a second grid (for example, an RS grid) that defines the intervals in the frequency direction and the time direction at which the UL reference signals are arranged, and transmitted from the user terminal.

The transmitting/receiving sections (transmission section) 103 may report information about the numerology grid and/or the RS grid to the user terminal. The information about the numerology grid may be information about the grid which the user terminal uses to communicate data and/or the like, and, if the numerology grid is defined in advance by the specification, information about the numerology that is configured in the user terminal may be used. Furthermore, the information about the RS grid may be information about $\Delta f_{num}$ and/or $\Delta t_{num}$. The information about $\Delta f_{num}$ and/or $\Delta t_{num}$ may be $\Delta f_{num}$ and/or $\Delta t_{num}$ themselves, or may be the parameters for determining $\Delta f_{num}$ and/or $\Delta t_{num}$.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 21:
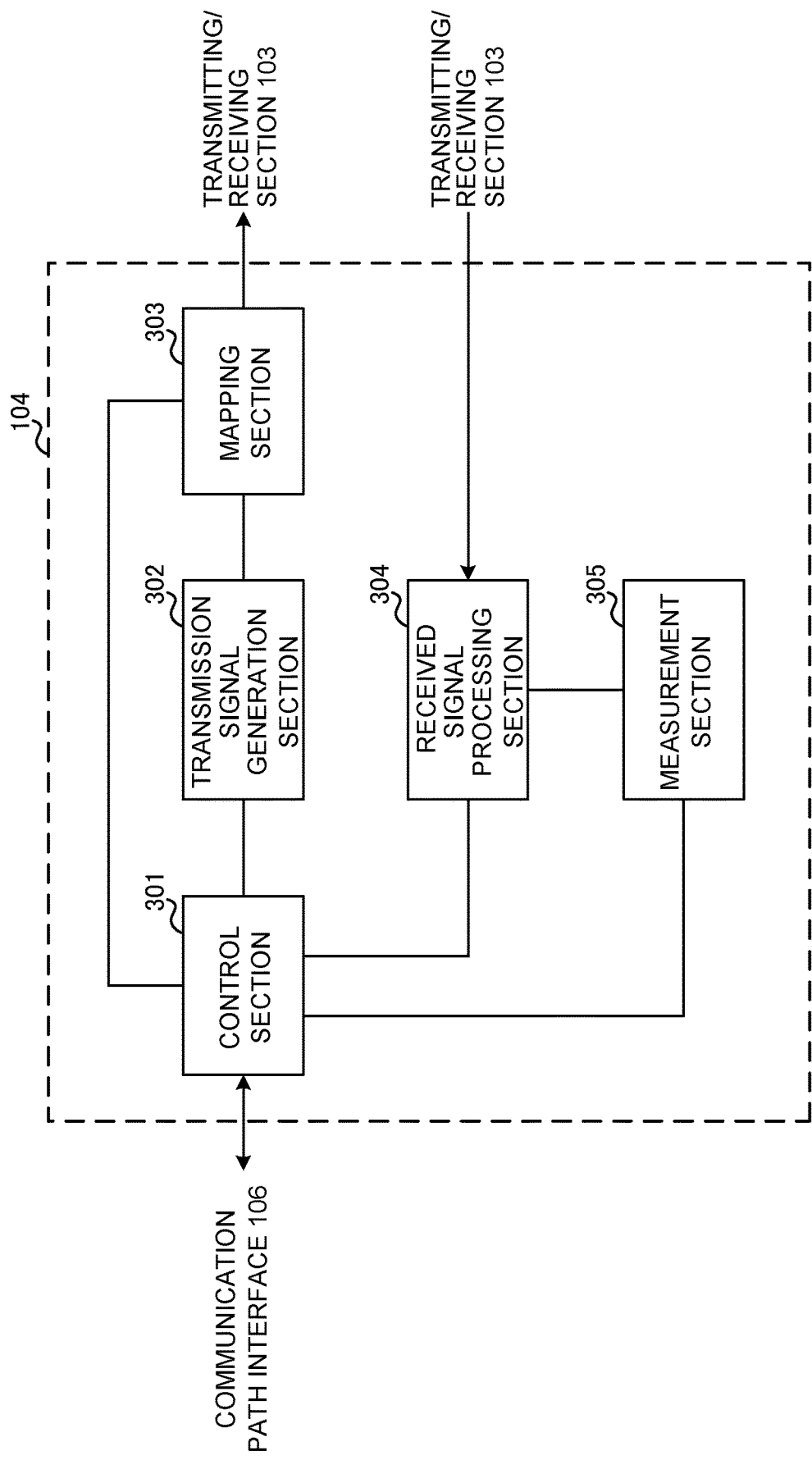
FIG. 21 is a diagram to show an example of a functional structure of a radio base station according to the present embodiment.

FIG. 21 is a diagram to show an example of a functional structure of a radio base station according to the present embodiment. Note that, although FIG. 21 primarily shows functional blocks that pertain to characteristic parts of the present embodiment, the radio base station 10 has other functional blocks that are necessary for radio communication as well. As shown in FIG. 21, a baseband signal processing section 104 has a control section (scheduler) 301, a transmission signal generation section (generation section) 302, a mapping section 303, a received signal processing section 304 and a measurement section 305.

The control section (scheduler) 301 controls the scheduling (for example, resource allocation) of DL data signals that are transmitted in the PDSCH and DL control signals that are communicated in the PDCCH and/or the EPDCCH. Also, the control section 301 controls the scheduling of system information, synchronization signals, paging information, CRSs (Cell-specific Reference Signals), CSI-RSs (Channel State Information Reference Signals) and so on. Furthermore, the control section 301 also controls the scheduling of uplink data signals that are transmitted in the PUSCH, UL control signals that are transmitted in the PUCCH and/or the PUSCH, and so on.

The control section (scheduler) 301 controls the scheduling (for example, resource allocation) of DL data signals, DL control signals, and so on. Furthermore, the control section (scheduler) 301 also controls the scheduling of system information, synchronization signals, paging information, DL reference signals and so on. Furthermore, the control section (scheduler) 301 controls the scheduling of UL reference signals, UL data signals, UL control signals and so on.

The control section (transmission section) 301 can control the transmission of DL signals and/or the reception of UL signals in the transmitting/receiving sections 103. In addition, the control section 301 can control the mapping of DL signals in the mapping section 303.

For example, the control section 301 may control the transmitting/receiving sections 103 to receive the UL reference signals that are mapped to at least one resource element (RE), based on the numerology grid (first grid) that defines each resource element composed of a subcarrier and a symbol, and the RS grid (second grid) that defines the arrangement intervals of DL reference signals in the frequency direction and the time direction. For the control section 301, a controller, a control circuit or control apparatus that can be described based on common understanding of the technical field to which the present invention pertains can be used.

The transmission signal generation section 302 generates DL signals (including DL data signals, DL control signals, DL reference signals, synchronization signals, broadcast signals, etc.) based on commands from the control section 301, and outputs these DL signals to the mapping section 303.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or a mapping device that can be described based on common understanding of the technical field to which the present invention pertains can be used.

The received signal processing section 304 performs the receiving process (for example, demapping, demodulation, decoding and so on) of uplink signals that are transmitted from the user terminals 20. The processing results are output to the control section 301. The control by the control section 301 may be performed based on CSI that is input from the received signal processing section 304.

The receiving process section 304 can be constituted by a signal processor, a signal processing circuit or a signal processing device, and a measurer, a measurement circuit or a measurement device that can be described based on common understanding of the technical field to which the present invention pertains.

The measurement section 305 measures UL received quality based on UL reference signals. The measurement section 305 outputs the measurement result to the control section 301. The measurement section 305 can be constituted by a measurement circuit or measurement apparatus that can be described based on general understanding of the technical field to which the present invention pertains.

User Terminal

Figure 22:
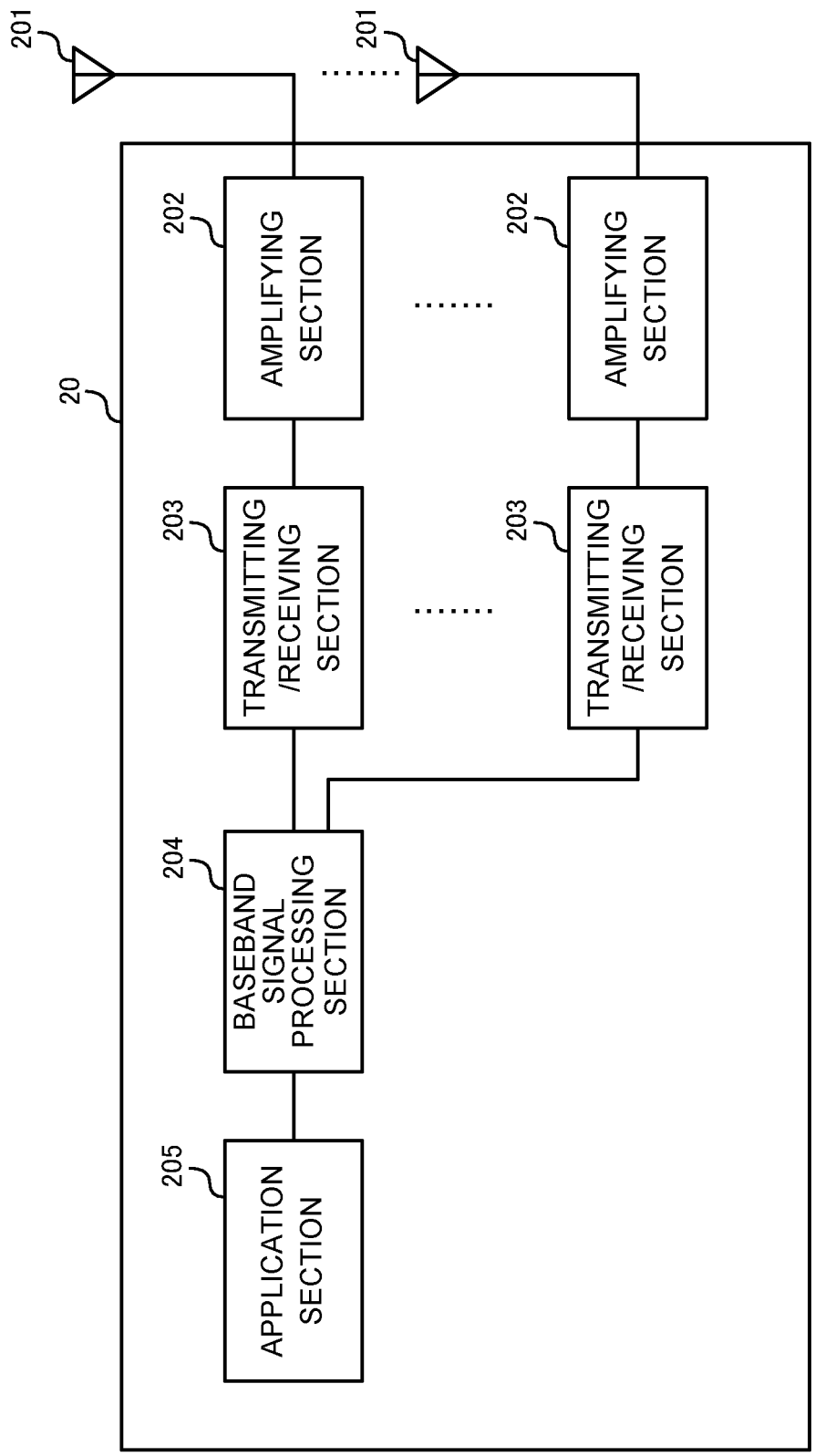
FIG. 22 is a diagram to show an example of an overall structure of a user terminal according to the present embodiment.

FIG. 22 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may include transmitting sections and receiving sections.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

The transmitting/receiving sections (receiving sections) 203 receive the DL signals transmitted from the radio base station (for example, DL data signals, DL control signals, DL reference signals, synchronization signals, broadcast signal, discovery signal, etc.).

In addition, the transmitting/receiving section (receiving section) 203 may receive information about the numerology grid (for example, $\Delta f_{num}$, $\Delta t_{num}$, etc.) and information about the RS grid (for example, $\Delta f_{RS}$, $\Delta t_{RS}$, etc.).

For the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Figure 23:
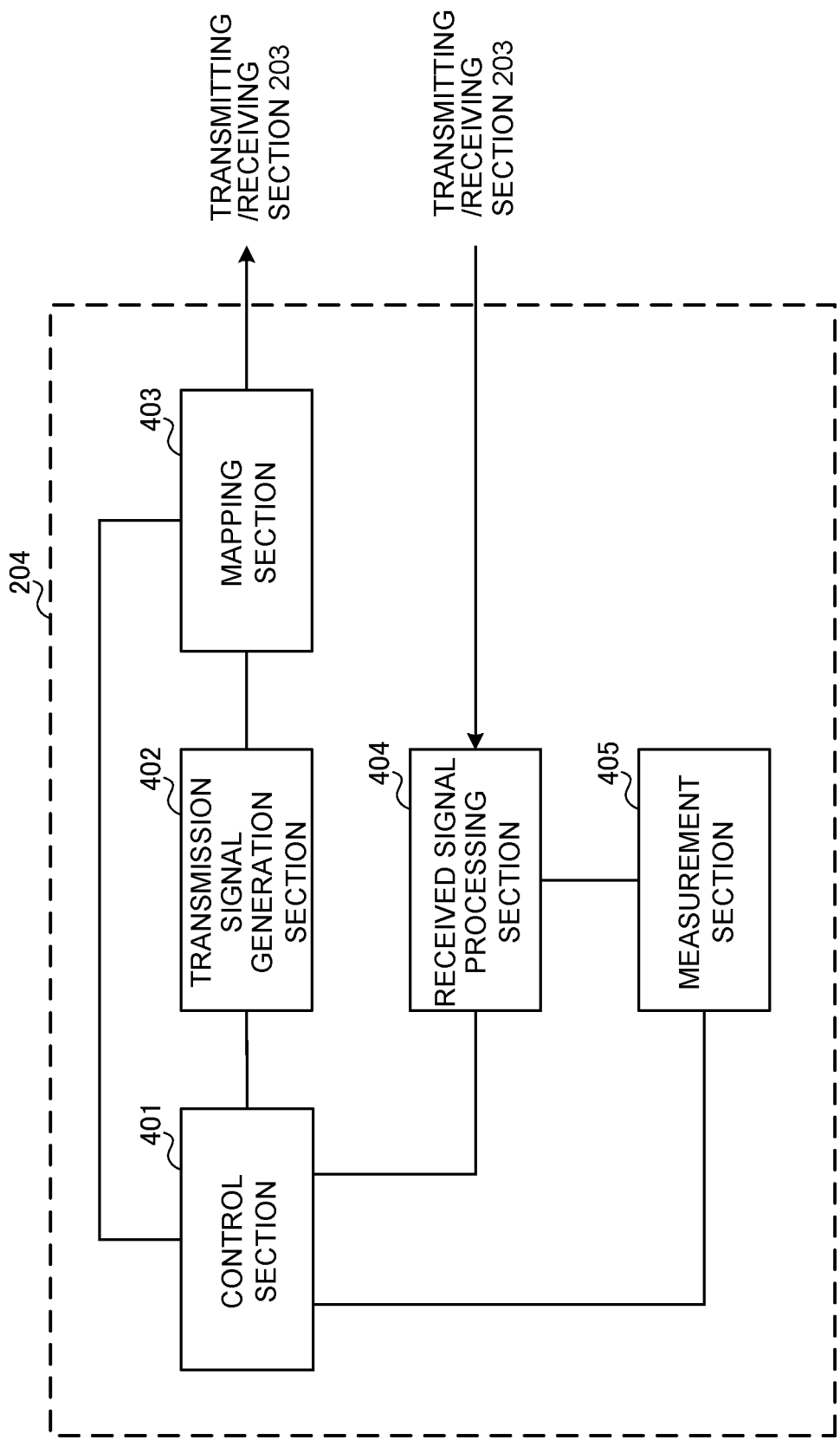
FIG. 23 is a diagram to show an example of a functional structure of a user terminal according to the present embodiment.

FIG. 23 is a diagram to show an example of a functional structure of a user terminal according to the present embodiment. Note that, although FIG. 23 primarily shows functional blocks that pertain to characteristic parts of the present embodiment, the user terminal 20 has other functional blocks that are necessary for radio communication as well. As shown in FIG. 23, the baseband signal processing section 204 provided in the user terminal 20 has a control section 401, a transmission signal generation section 402, a mapping section 403, a received signal processing section 404 and a measurement section 405.

The control section 401 acquires the DL control signals (PDCCH/EPDCCH) and DL data signals (PDSCH) transmitted from the radio base station 10, via the received signal processing section 404. The control section 401 controls the generation of uplink control signals (for example, delivery acknowledgement signals (HARQ-ACKs) and so on) and uplink data signals based on the DL control signals, the results of deciding whether or not retransmission control is necessary in response to the DL data signals, and so on. To be more specific, the control section 401 can control the transmission signal generation section 402, the mapping section 403 and the received signal processing section 404.

The control section 401 can control the transmission of UL signals and/or the reception of DL signals by the transmitting/receiving sections (transmission section) 203. In addition, the control section 401 can control the mapping of UL signals by the mapping section 403.

For example, the control section 401 may control the mapping section 403 to map UL reference signals to at least one resource element (RE) based on the numerology grid (first grid), which defines each resource element composed of a subcarrier and a symbol, and the RS grid (second grid), which defines the arrangement intervals of DL reference signals in the frequency direction and the time direction (first aspect).

Here, in the RS grid, the arrangement interval of UL reference signals in the frequency direction may be determined based on delay spread, and the arrangement interval of UL reference signals in the time direction may be determined based on the Doppler frequency (FIG. 2). Also, multiple RS grids may be configured for a single numerology grid (FIG. 3 to FIG. 5), a single RS grid may be configured for multiple numerology grids (FIG. 6 to FIG. 8), or multiple RS grids that respectively correspond to multiple numerology grids may be configured.

In addition, the control section 401 may control the arrangement interval in the frequency direction and/or the arrangement interval in the time direction in the RS grid based on the intervals between subcarriers (subcarrier spacing) and/or the time duration of symbols (symbol duration) in each RE, which are determined by the numerology grid (see FIG. 10A, FIG. 11 and FIG. 12D).

Also, when there are multiple REs that serve as candidates for mapping UL reference signals (candidate REs), the control section 401 may map UL reference signals to at least one of these multiple REs (see FIG. 12B and FIG. 12C).

Also, the control section 401 may control the configuration of RS grids based on channels arranged in the resource unit. To be more specific, the base symbol and/or the base subcarrier to serve as the basis when superimposing the RS grid on the numerology grid may be determined based on channels arranged in the resource unit (FIG. 13).

Also, the control section 401 may change the REs for arranging UL reference signals, that are determined by the numerology grid and the RS grid. To be more specific, based on the number of REs in one resource unit, the control section 401 may add REs for arranging UL reference signals, remove (puncture) at least one of the REs for arranging UL reference signals, or shift at least one of the REs for arranging UL reference signals in the frequency direction and/or the time direction (FIG. 14).

In addition, the control section 401 may control the generation of UL signals by the transmission signal generation section 402 (second aspect). To be more specific, the control section 401 may control the generation of the UL reference signals based on at least one of cell identification information, user terminal identification information, scrambling identification information, slot numbers and higher layer control information.

For example, the control section 401 may control the transmission signal generation section 402 to generate a PN sequence or Zadoff-Chu sequence that is initialized (to be sequence seed) based on at least one of cell identification information, user terminal identification information, scrambling identification information, slot numbers and higher layer control information and to generate a UL reference signal based on the PN sequence or the Zadoff-Chu sequence.

In addition, the control section 401 may determine the RE (mapping RE) mapping the DM-RSs based on the numerology grid and the RS grid (third aspect). To be more specific, the control section 401 may determine the RE on the RS grid at a specific subcarrier and the RE on the RS grid at a specific symbol as the mapping RE (FIG. 15 to FIG. 18).

In addition, the control section 401 can configure by combining the parameters (at least one of the number of sequences, the amount of cyclic shift, the number of root sequences, CP duration, etc.) of the random access preamble and the RS grid (fourth aspect). For example, the control section 401 can perform control such that the parameters of the random access preamble configured as a set with the RS grid are reported to the user terminal via higher layer signaling, and the like.

In addition, the control section 401 can control the UL transmission power based on the amount of UL reference signals allocated to the TTI (for example, subframe) (fifth aspect). For example, the control section 401 can configure the UL transmission power to be small as the amount (proportion) of the UL reference signals transmitted in one TTI increases, whereas the control section 401 can configure the UL transmission power to be large as the amount of the UL reference signals transmitted in one TTI decreases.

Note that the RS grid may be configured for each DM-RS and/or CSI-RS antenna port, or one RS grid for multiple antenna ports may be configured. The control section 401 may multiplex DM-RSs of a plurality of antenna ports using at least one of CDM, FDM and TDM. Similarly, the control section 401 may multiplex CSI-RSs of a plurality of antenna ports using at least one of CDM, FDM and TDM.

In addition, the control section 401 may control the configuration with the numerology grid and the RS grid based on the information on the numerology grid and the information on the RS grid reported from the radio base station 10. For the control section 401, a controller, a control circuit or control apparatus that can be described based on common understanding of the technical field to which the present invention pertains, can be used.

The transmission signal generation section 402 generates UL signals based on commands from the control section 401, and outputs these signals to the mapping section 403. For example, the transmission signal generation section 402 generates uplink control signals such as delivery acknowledgement signals (HARQ-ACKs), channel state information (CSI) and so on, based on commands from the control section 401.

Also, the transmission signal generation section 402 generates uplink data signals based on commands from the control section 401. For example, when a UL grant is included in a DL control signal that is reported from the radio base station 10, the control section 401 commands the transmission signal generation section 402 to generate an uplink data signal. For the transmission signal generation section 402, a signal generator, a signal generating circuit or a signal generating device that can be described based on common understanding of the technical field to which the present invention pertains can be used.

The mapping section 403 maps the UL signals (UL control signals and/or UL data signals) generated in the transmission signal generation section 402 to radio resources based on commands from the control section 401, and outputs the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of DL signals (for example, DL control signals transmitted from the radio base station, DL data signals transmitted in the PDSCH, and so on). The received signal processing section 404 outputs the information received from the radio base station 10, to the control section 401 and the measurement section 405. The received signal processing section 404 outputs, for example, broadcast information, system information, RRC signaling, DCI and so on, to the control section 401.

The received signal processing section 404 can be constituted by a signal processor, a signal processing circuit or a signal processing device, and a measurer, a measurement circuit or a measurement device that can be described based on common understanding of the technical field to which the present invention pertains. Also, the received signal processing section 404 can constitute the receiving section according to the present invention.

The measurement section 405 performs CSI measurements and/or RRM measurements based on DL reference signals. The measurement section 405 outputs the measurement results to the control section 401. The measurement section 405 can be constituted by a measurement circuit or measurement apparatus that can be described based on general understanding of the technical field to which the present invention pertains.

Hardware Structure

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 24:
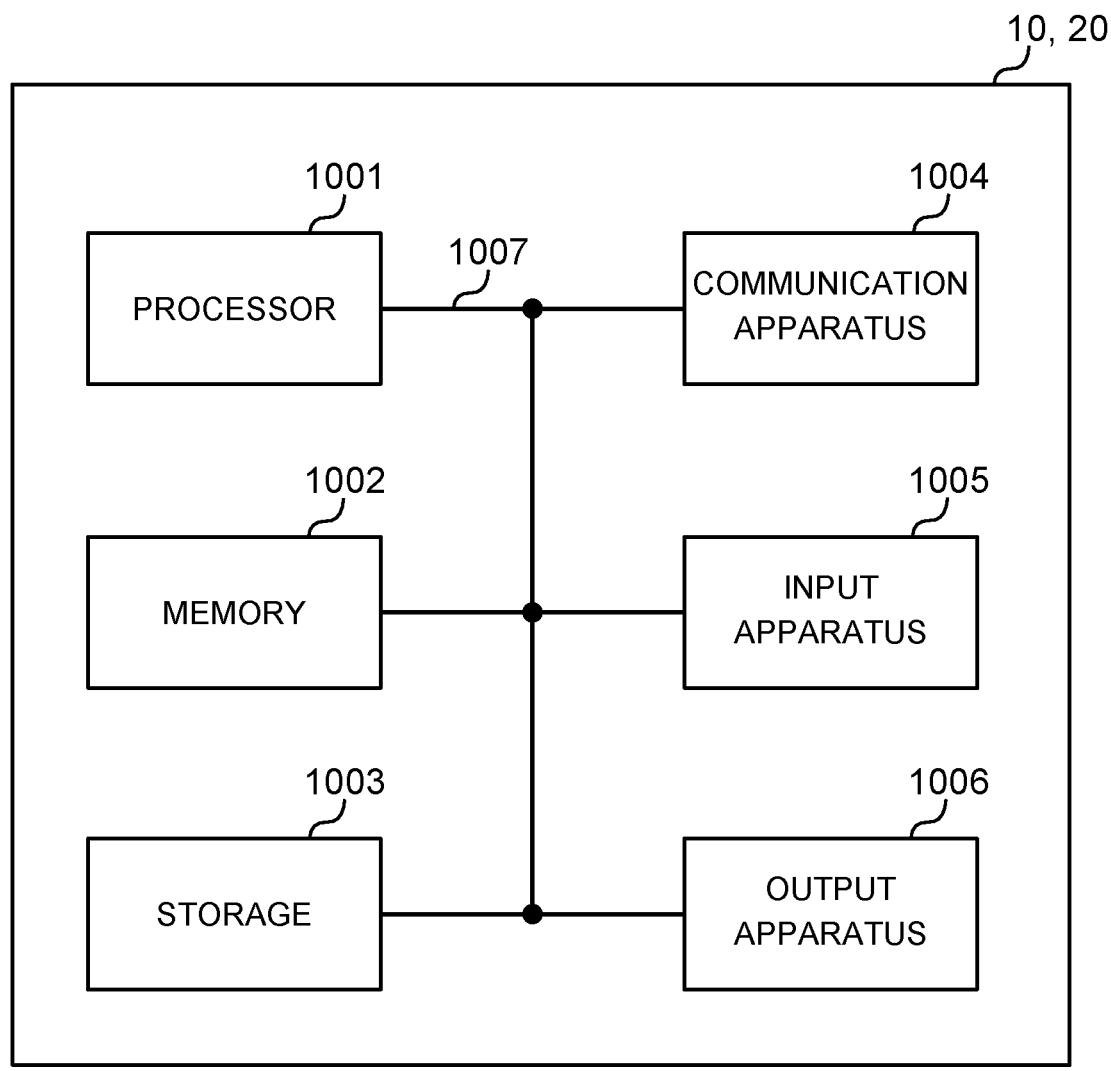
FIG. 24 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 24 is a diagram to show an example hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously, in sequence, or in different manners, on one or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and the like for implementing the radio communication methods according to present embodiment.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be composed of one or more periods (frames) in the time domain. Each of one or more periods (frames) constituting a radio frame may be referred to as a "subframe." Furthermore, a subframe may be composed of one or more slots in the time domain. Furthermore, a slot may be composed of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be composed of one or more resource blocks. Note that an RB may be referred to as a "physical resource block" (PRB: Physical RB), a "PRB pair," an "RB pair," or the like.

Furthermore, a resource block may be composed of one or more resource elements (REs). For example, one RE may be a radio resource field of one subcarrier and one symbol. Note that one RE is not limited to the name "RE," as long as it is a resource unit (for example, the minimum resource unit) that is smaller than the resource unit that serves as the unit of resource allocation (also referred to as the "resource block" and so on).

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be removed. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network composed of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-082531, filed on Apr. 15, 2016, including the specification, drawings and abstract, is incorporated herein by reference in its entirety.

The invention claimed is:

1. A terminal comprising:
   a transmitter that transmits an uplink (UL) reference signal; and
   a processor that controls transmission of the UL reference signal,
   wherein the processor maps the UL reference signal to at least one resource element based on a first grid, which defines a subcarrier spacing and a symbol length of each resource element, and on a second grid, which is independent of the first grid and defines an arrangement interval of the UL reference signal in a frequency direction and an arrangement interval of the UL reference signal in a time direction.

2. The terminal according to claim 1, wherein, in the second grid, the arrangement interval in the frequency direction is determined based on delay spread, and the arrangement interval in the time direction is determined based on Doppler frequency.

3. The terminal according to claim 1, wherein the processor controls the arrangement interval in the frequency direction and/or the arrangement interval in the time direction in the second grid based on the subcarrier spacing and/or the symbol length.

4. The terminal according to claim 1, wherein, when there are a plurality of resource elements that serve as candidates for mapping the UL reference signal, the processor maps the UL reference signal to at least one of the plurality of resource elements.

5. The terminal according to claim 1, wherein the first and/or the second grid is selected from a plurality of candidate grids that are determined in advance or configured by higher layer signaling.

6. A radio communication method for a terminal, comprising:
   transmitting an uplink (UL) reference signal; and
   mapping the UL reference signal to at least one resource element based on a first grid, which defines a subcarrier spacing and a symbol length of each resource element, and on a second grid, which is independent of the first grid and defines an arrangement interval of the UL reference signal in a frequency direction and an arrangement interval of the UL reference signal in a time direction.

7. The terminal according to claim 2, wherein the processor controls the arrangement interval in the frequency direction and/or the arrangement interval in the time direction in the second grid based on the subcarrier spacing and/or the symbol length.

8. The terminal according to claim 2, wherein, when there are a plurality of resource elements that serve as candidates for mapping the UL reference signal, the processor maps the UL reference signal to at least one of the plurality of resource elements.

9. The terminal according to claim 2, wherein the first and/or the second grid is selected from a plurality of candidate grids that are determined in advance or configured by higher layer signaling.

10. The terminal according to claim 3, wherein the first and/or the second grid is selected from a plurality of candidate grids that are determined in advance or configured by higher layer signaling.

11. A base station comprising:
    a receiving section configured to receive an uplink (UL) reference signal,
    wherein the UL reference signal is mapped to at least one resource element based on a first grid, which defines a subcarrier spacing and a symbol length of each resource element, and on a second grid, which is independent of the first grid and defines an arrangement interval of the UL reference signal in a frequency direction and an arrangement interval of the UL reference signal in a time direction.

* * * * *